US012722619B2

(12) United States Patent
Oguro et al.

(10) Patent No.: US 12,722,619 B2
(45) Date of Patent: Sep. 1, 2026

(54) VEHICLE CONTROL APPARATUS

(71) Applicant: SUBARU CORPORATION, Tokyo (JP)

(72) Inventors: Chihiro Oguro, Tokyo (JP); Kentaro Ishii, Tokyo (JP); Kazumi Kojima, Tokyo (JP); Yoshinobu Yamazaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 481 days.

(21) Appl. No.: 18/151,034

(22) Filed: Jan. 6, 2023

(65) Prior Publication Data

US 2023/0256956 A1 Aug. 17, 2023

(30) Foreign Application Priority Data

Feb. 14, 2022 (JP) ................................ 2022-020460

(51) Int. Cl.
*B60W 10/184* (2012.01)
*B60L 7/10* (2006.01)
(Continued)

(52) U.S. Cl.
CPC ............. *B60W 10/184* (2013.01); *B60L 7/10* (2013.01); *B60W 10/08* (2013.01);
(Continued)

(58) Field of Classification Search
CPC ............... B60W 10/184; B60W 10/08; B60W 30/18127; B60W 2520/10;
(Continued)

(56) References Cited

U.S. PATENT DOCUMENTS 10,336,195 B2 * 7/2019 Suzuki ................ B60L 15/2009
2013/0054062 A1 * 2/2013 Matsushita ....... B60W 30/1843 701/22

(Continued)

FOREIGN PATENT DOCUMENTS

CN 103448713 A * 12/2013 ...... B60W 30/18109
CN 103481886 A * 1/2014 .............. B60L 58/15

(Continued)

OTHER PUBLICATIONS

JP2003127721A—Braking controller for vehicle—Google Patents _English Translation (Year: 2001).*

*Primary Examiner* — Fadey S. Jabr
*Assistant Examiner* — Ahmed Alkirsh
(74) *Attorney, Agent, or Firm* — Rimon P.C.

(57) ABSTRACT

A vehicle control apparatus to be applied to a vehicle includes an electric motor, a brake mechanism, and a control system. The control system increases a friction braking force of the brake mechanism while reducing a regenerative braking force of the electric motor, in deceleration traveling performed in a low vehicle speed range where a vehicle speed of the vehicle is less than a first threshold in a state in which an accelerator operation and a brake operation performed by a driver who drives the vehicle are canceled. The control system corrects correlation data between a control instruction value indicated to the brake mechanism and the friction braking force generated by the control instruction value, by using, as a trigger, a situation in which a change rate of a vehicle acceleration of the vehicle exceeds a second threshold in the deceleration traveling in the low vehicle speed range.

7 Claims, 17 Drawing Sheets

(51) Int. Cl.
*B60W 10/08* (2006.01)
*B60W 30/18* (2012.01)

(52) U.S. Cl.
CPC ... *B60W 30/18127* (2013.01); *B60W 2520/10* (2013.01); *B60W 2520/105* (2013.01); *B60W 2540/10* (2013.01); *B60W 2540/12* (2013.01); *B60W 2710/08* (2013.01); *B60W 2710/182* (2013.01)

(58) Field of Classification Search
CPC ....... B60W 2520/105; B60W 2540/10; B60W 2540/12; B60W 2710/08; B60W 2710/182; B60L 7/10
USPC ............................................................ 701/22
See application file for complete search history.

(56) References Cited

U.S. PATENT DOCUMENTS

2019/0299786 A1* 10/2019 Nakagawa ................ B60L 3/00
2023/0322224 A1* 10/2023 Iba ...................... B60L 15/2009
701/70

FOREIGN PATENT DOCUMENTS

| | | | | | |
|---|---|---|---|---|---|
| CN | 110198874 | B | * | 5/2022 | .......... B60L 15/2072 |
| CN | 116056941 | A | * | 5/2023 | ............ B60W 10/18 |
| DE | 102021131843 | A1 | * | 7/2022 | .......... B60L 15/2009 |
| EP | 1306263 | A2 | * | 5/2003 | ............... B60K 6/44 |
| JP | 2003127721 | A | * | 5/2003 | ...... B60W 30/18127 |
| JP | 2013049368 | A | * | 3/2013 | ........ B60W 30/1843 |
| JP | 2016034818 | A | * | 3/2016 | |
| WO | WO-03059680 | A1 | * | 7/2003 | ........ B60W 30/1819 |
| WO | WO-2011114557 | A1 | * | 9/2011 | .......... B60T 8/17616 |
| WO | WO-2012043683 | A1 | * | 4/2012 | ............ B60W 10/16 |

* cited by examiner

VEHICLE CONTROL APPARATUS

CROSS-REFERENCE TO RELATED APPLICATIONS

The present application claims priority from Japanese Patent Application No. 2022-020460 filed on Feb. 14, 2022, the entire contents of which are hereby incorporated by reference.

BACKGROUND

The disclosure relates to a vehicle control apparatus to be applied to a vehicle.

A vehicle, such as an automobile, is provided with not only a friction brake that causes deceleration by using a friction braking force, but also a regenerative brake that causes deceleration by using a regenerative braking force. For example, reference is made to Japanese Unexamined Patent Application Publication Nos. 2016-34818, 2003-127721, and 2013-49368.

SUMMARY

An aspect of the disclosure provides a vehicle control apparatus to be applied to a vehicle. The vehicle control apparatus includes an electric motor, a brake mechanism, and a control system. The electric motor is coupled to one or both of a first wheel and a second wheel of the vehicle. The brake mechanism is configured to brake one or both of the first wheel and the second wheel. The control system includes a processor and a memory that are communicably coupled to each other. The control system is configured to control the electric motor and the brake mechanism. The control system is configured to increase a friction braking force of the brake mechanism while reducing a regenerative braking force of the electric motor, in deceleration traveling performed in a low vehicle speed range where a vehicle speed of the vehicle is less than a first threshold in a state in which an accelerator operation and a brake operation performed by a driver who drives the vehicle are canceled. The control system is configured to correct correlation data between a control instruction value indicated to the brake mechanism and the friction braking force generated by the control instruction value, by using, as a trigger, a situation in which a change rate of a vehicle acceleration of the vehicle exceeds a second threshold in the deceleration traveling in the low vehicle speed range.

An aspect of the disclosure provides a vehicle control apparatus to be applied to a vehicle. The vehicle control apparatus includes an electric motor, a brake mechanism, and circuitry. The electric motor is coupled to one or both of a first wheel and a second wheel of the vehicle. The brake mechanism is configured to brake one or both of the first wheel and the second wheel. The circuitry is configured to control the electric motor and the brake mechanism. The circuitry is configured to increase a friction braking force of the brake mechanism while reducing a regenerative braking force of the electric motor, in deceleration traveling performed in a low vehicle speed range where a vehicle speed of the vehicle is less than a first threshold in a state in which an accelerator operation and a brake operation performed by a driver who drives the vehicle are canceled. The circuitry is configured to correct correlation data between a control instruction value indicated to the brake mechanism and the friction braking force generated by the control instruction value, by using, as a trigger, a situation in which a change rate of a vehicle acceleration of the vehicle exceeds a second threshold in the deceleration traveling in the low vehicle speed range.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 14 is a diagram illustrating an example of a situation in which the correlation data is corrected.

DETAILED DESCRIPTION

Figure 1:
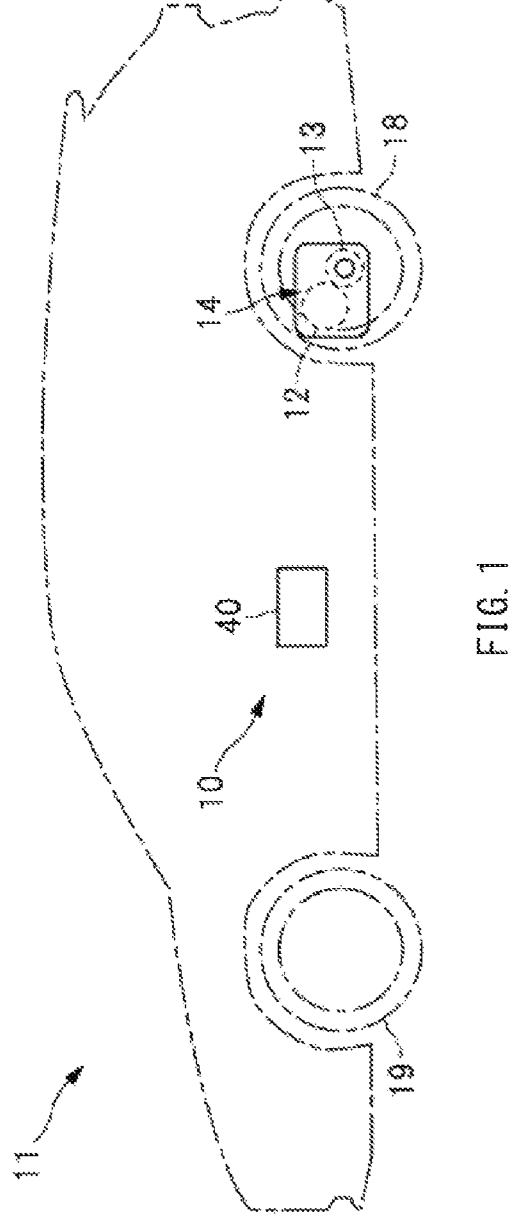
FIG. 1 is a diagram illustrating a configuration example of a vehicle provided with a vehicle control apparatus according to one example embodiment of the disclosure.

In deceleration traveling in which an accelerator operation and a brake operation are canceled, a regenerative brake may be actively operated toward a vehicle stop, in terms of enhancing energy efficiency of a vehicle. Even in such a case of operating the regenerative brake toward the vehicle stop, a rotation speed of an electric motor decreases in a low vehicle speed range. Accordingly, a regenerative braking force generated by the regenerative brake is reduced toward the vehicle stop, and a friction braking force generated by a friction brake is increased toward the vehicle stop, in many cases. However, control accuracy of the friction brake is lower than that of the regenerative brake, which can cause a shock when the regenerative braking force is reduced and the friction braking force is increased. To suppress the shock caused by this switching from the regenerative braking force to the friction braking force, it is desired to enhance control accuracy of the friction braking force.

It is desirable to enhance control accuracy of a friction braking force.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[Configuration of Vehicle]

Figure 2:
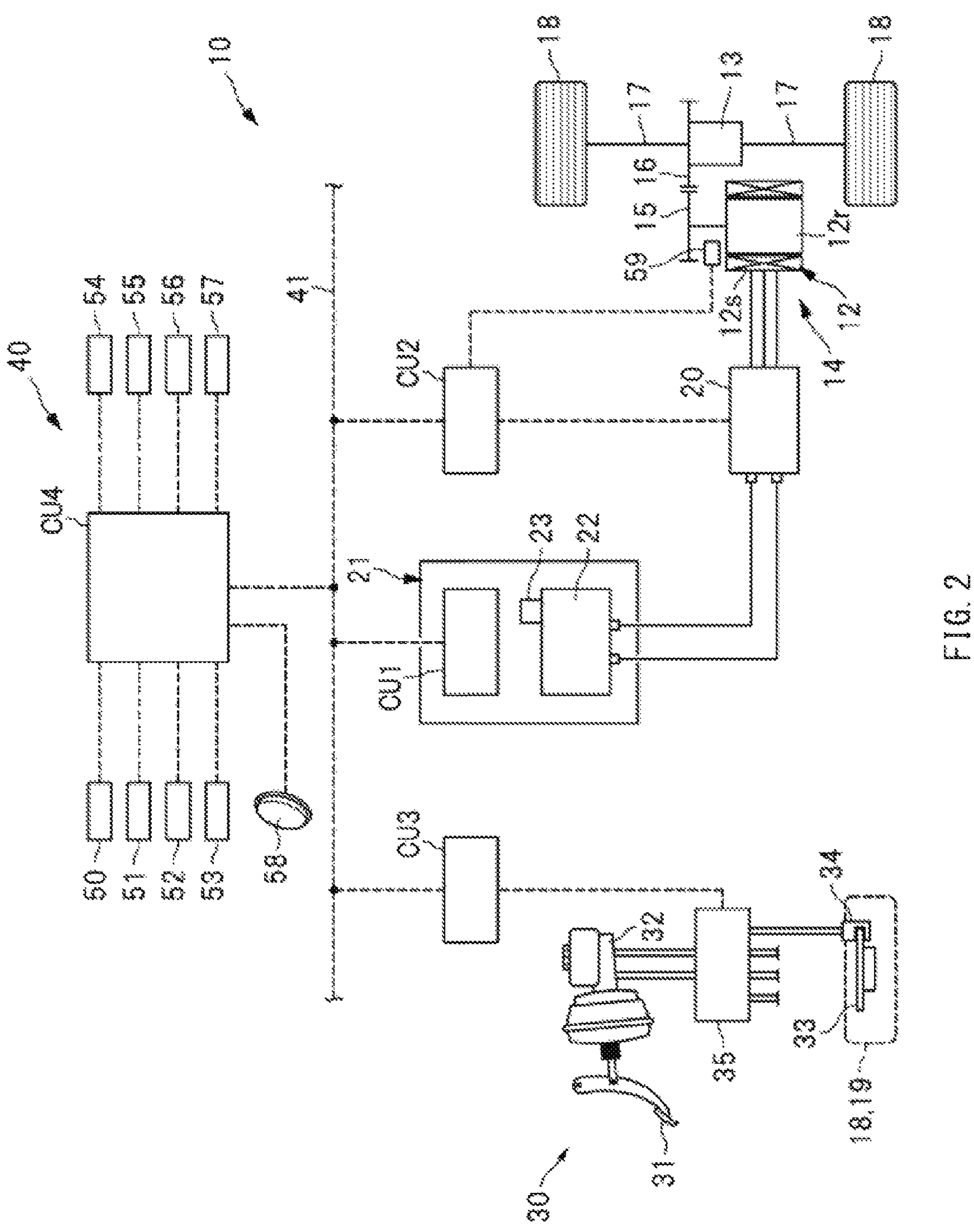
FIG. 2 is a diagram illustrating a configuration example of the vehicle control apparatus.

FIG. 1 is a diagram illustrating an example of a configuration of a vehicle 11 provided with a vehicle control apparatus 10 according to an example embodiment of the disclosure. FIG. 2 is a diagram illustrating a configuration example of the vehicle control apparatus 10. As illustrated in FIG. 1, the vehicle 11 may be equipped with an electric axle 14 including a motor generator 12 and a differential mechanism 13. In one embodiment, the motor generator 12 may serve as an “electric motor”. As illustrated in FIG. 2, the motor generator 12 included in the electric axle 14 may have a rotor 12*r* coupled to a drive gear 15. The drive gear 15 may be in mesh with a driven gear 16 fixed to the differential mechanism 13. An axle 17 extending from the differential mechanism 13 may be coupled to left and right rear wheels 18. The motor generator 12 of the electric axle 14 may thus be coupled to the rear wheels 18 of the vehicle 11. In one embodiment, the rear wheels 18 may each serve as a “first wheel”. Note that the motor generator 12 may be coupled to only the rear wheels 18 in the illustrated example. However, this is non-limiting. The motor generator 12 may be coupled to either or both of front wheels 19 and the rear wheels 18. For example, the motor generator 12 may be coupled to only the front wheels 19, or the motor generator 12 may be coupled to both the front wheels 19 and the rear wheels 18. In one embodiment, the front wheels 19 may each serve as a “second wheel”.

As illustrated in FIG. 2, the motor generator 12 included in the electric axle 14 may have a stator 12*s* coupled to a battery pack 21 via an inverter 20. The battery pack 21 may include a battery module 22 including multiple battery cells, and a battery control unit CU1 that monitors charging and discharging of the battery module 22. The battery pack 21 may also include a battery sensor 23 that detects, for example, a charging/discharging current and a terminal voltage. The battery control unit CU1 may calculate a state of charge (SOC) of the battery module 22 on the basis of, for example, the charging/discharging current and the terminal voltage detected by the battery sensor 23. Note that the SOC of the battery module 22 may refer to a rate indicating the remaining amount of electric power in the battery module 22. The SOC of the battery module 22 may be the rate of a charged amount to the full charge capacity of the battery module 22.

The inverter 20 may control an energization state of the motor generator 12, and may include, for example, multiple switching devices. A motor control unit CU2 may be coupled to the inverter 20. The motor control unit CU2 may control the inverter 20 to thereby control a motor torque outputted from the motor generator 12. Note that examples of the motor torque outputted from the motor generator 12 may include a power running torque and a regenerative torque. The power running torque may be generated on an acceleration side by controlling the motor generator 12 to be in a power running state. The regenerative torque, i.e., a power generation torque, may be generated on a deceleration side by controlling the motor generator 12 to be in a regeneration state.

The vehicle 11 may include a brake mechanism 30 that puts a brake on the front wheels 19 and the rear wheels 18. The brake mechanism 30 may include a master cylinder 32 that outputs a brake fluid pressure in conjunction with a brake pedal 31, and calipers 34 that put a brake on disc rotors 33 of the respective front wheels 19 and rear wheels 18. Between the master cylinder 32 and the calipers 34 may be a brake actuator 35 that controls the brake fluid pressure to be supplied to each of the calipers 34. The brake actuator 35 may include unillustrated devices including, for example, an electric pump, an accumulator, and an electromagnetic valve. A brake control unit CU3 may be coupled to the brake actuator 35. The brake control unit CU3 may control the brake fluid pressure by controlling, for example, the electromagnetic valve. Note that the brake mechanism 30 may be a drum brake, without being limited to the illustrated disc brake.

Figure 3:
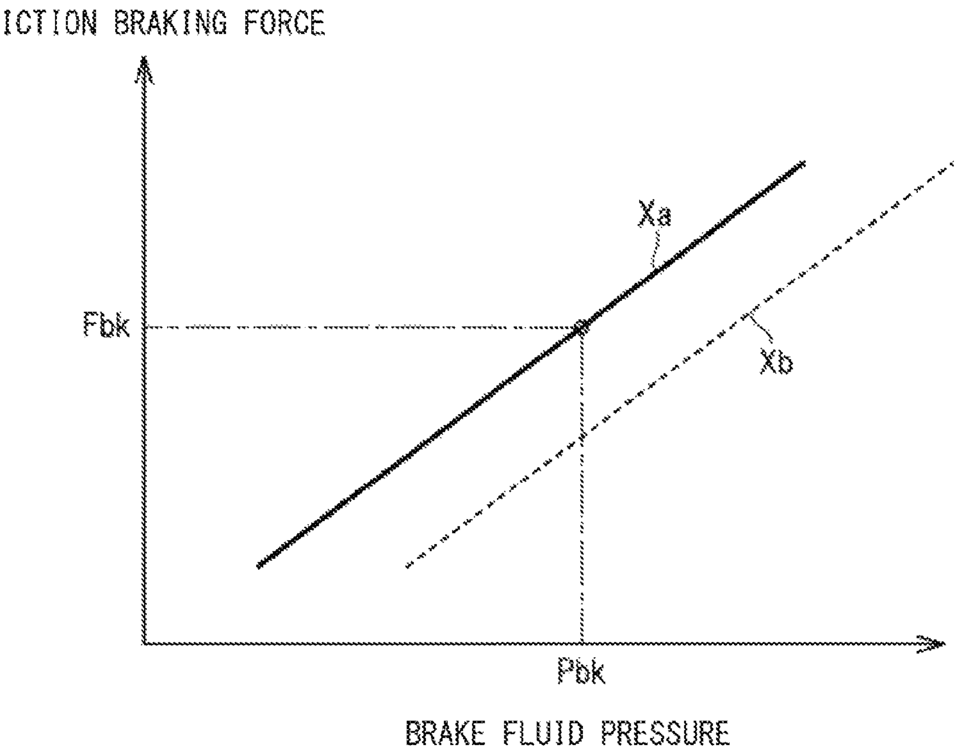
FIG. 3 is a diagram illustrating an example of correlation data between a friction braking force and a brake fluid pressure.

FIG. 3 illustrates an example of correlation data between a friction braking force and the brake fluid pressure. As illustrated in FIG. 3, the brake actuator 35 may control the brake fluid pressure to thereby control the friction braking force that is a total of braking forces to be applied to the disc rotors 33 of the respective front wheels 19 and rear wheels 18. For example, in a case of controlling the friction braking force of the brake mechanism 30 to “Fbk”, the brake fluid pressure may be regulated to “Pbk” by the brake actuator 35, as indicated by a characteristic line Xa in FIG. 3. In other words, the brake control unit CU3 may set a target brake fluid pressure Pbk on the basis of the target friction braking force Fbk, and transmit the target brake fluid pressure Pbk to the brake actuator 35. In one embodiment, the target brake fluid pressure Pbk may serve as a “control instruction value”. The brake actuator 35 may control the brake fluid pressure to “Pbk” to control the friction braking force of the brake mechanism 30 to “Fbk”.

[Control System]

As illustrated in FIG. 2, the vehicle control apparatus 10 includes a control system 40. The control system 40 may control, for example, the motor generator 12 and the brake actuator 35, and may include multiple electronic control units. Examples of the electronic control units in the control system 40 may include the battery control unit CU1, the motor control unit CU2, and the brake control unit CU3, which are described above. Further examples of the electronic control units in the control system 40 may include a vehicle control unit CU4. The vehicle control unit CU4 may output a control signal to each of the control units CU1 to CU3. The control units CU1 to CU4 may be communicably coupled to each other via an in-vehicle network 41 such as a controller area network (CAN). The vehicle control unit CU4 may set operation targets of, for example, the electric axle 14 and the brake mechanism 30, on the basis of data received from the control units CU1 to CU3 and various sensors to be described later. Thereafter, the vehicle control unit CU4 may generate control signals based on the operation targets of, for example, the electric axle 14 and the brake mechanism 30, and output the control signals to the control units CU1 to CU3.

Examples of the sensors coupled to the vehicle control unit CU4 may include a vehicle speed sensor 50, an accelerator sensor 51, and a brake sensor 52. The vehicle speed sensor 50 may detect a vehicle speed, that is, a traveling speed of the vehicle 11. The accelerator sensor 51 may detect an amount of an operation performed on an accelerator pedal (hereinafter referred to as an accelerator position). The brake sensor 52 may detect an amount of an operation performed on the brake pedal 31. Further examples of the sensors coupled to the vehicle control unit CU4 may include an acceleration sensor 53 and wheel speed sensors 54, 55, 56, and 57. The acceleration sensor 53 may detect a vehicle acceleration applied in a front-rear direction of the vehicle. The wheel speed sensors 54, 55, 56, and 57 may detect respective rotation speeds (hereinafter referred to as wheel speeds) of the left and right rear wheels 18 and the left and right front wheels 19. In addition, a start switch 58 may be coupled to the vehicle control unit CU4. The start switch 58 may be operated by a driver who drives the vehicle 11 to start up the control system 40. In addition, examples of a sensor coupled to the motor control unit CU2 may include a motor rotation sensor 59, such as a resolver, that detects a rotation angle (hereinafter referred to as a rotor rotation angle) of the rotor 12*r*.

Figure 4:
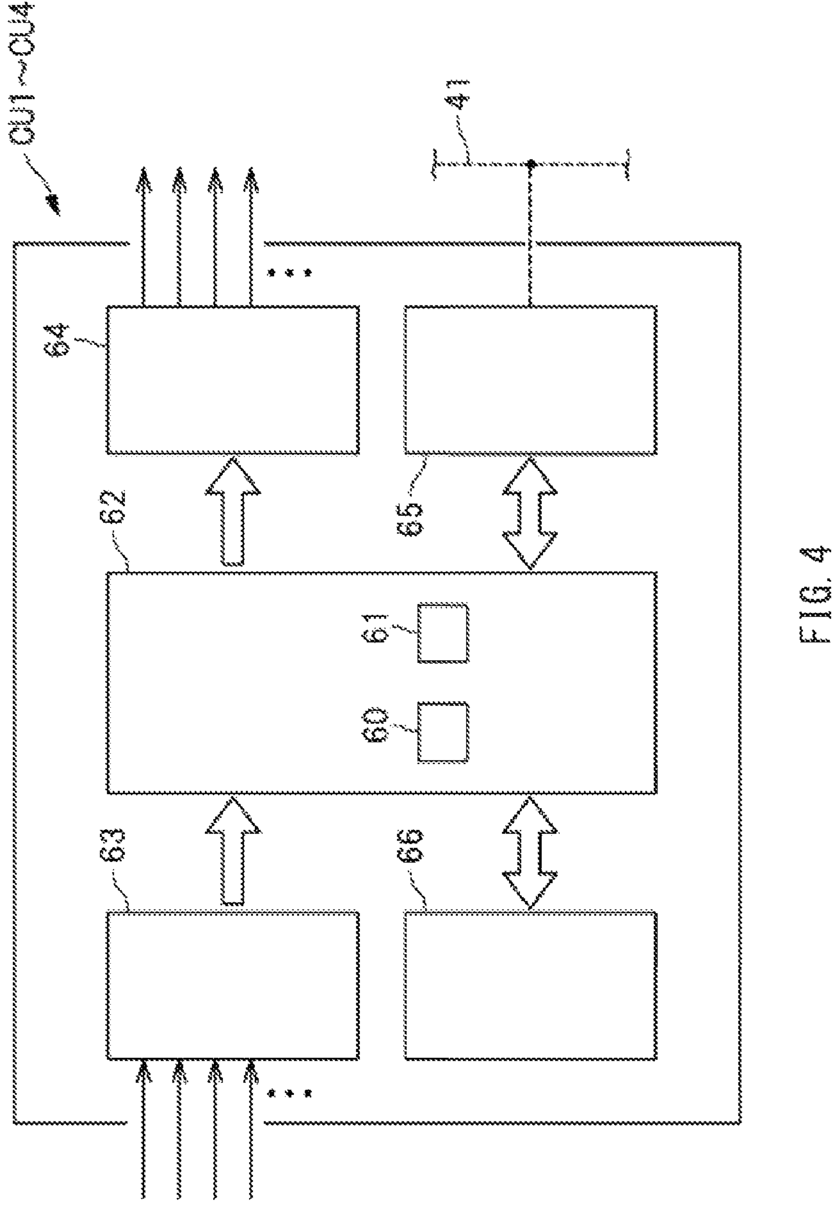
FIG. 4 is a diagram illustrating an example of a basic configuration of each control unit.

FIG. 4 illustrates an example of a basic configuration of each of the control units CU1 to CU4. As illustrated in FIG. 4, the control units CU1 to CU4 may each include a microcontroller 62 that includes devices including, for example, a processor 60 and a main memory 61. In one embodiment, the main memory 61 may serve as a "memory". The main memory 61 may hold a predetermined program. The processor 60 may execute the program. The processor 60 and the main memory 61 are communicably coupled to each other. In the example illustrated in FIG. 4, the microcontroller 62 may include one processor 60 and one main memory 61. However, this is non-limiting. The microcontroller 62 may include multiple processors 60. The microcontroller 62 may include multiple main memories 61.

The control units CU1 to CU4 may each include devices including, for example, an input circuit 63, a drive circuit 64, a communication circuit 65, and an external memory 66. The input circuit 63 may convert signals received from various sensors into signals receivable by the microcontroller 62. The drive circuit 64 may generate drive signals for driving an actuator, such as the brake actuator 35 described above, on the basis of signals outputted from the microcontroller 62. The communication circuit 65 may convert the signals outputted from the microcontroller 62 into communication signals to be transmitted to the other control units. The communication circuit 65 may also convert communication signals received from the other control units into signals receivable by the microcontroller 62. The external memory 66 may be, for example, a nonvolatile memory, and may hold a program and various pieces of data, for example.

[Requested Driving Force]

Figure 5:
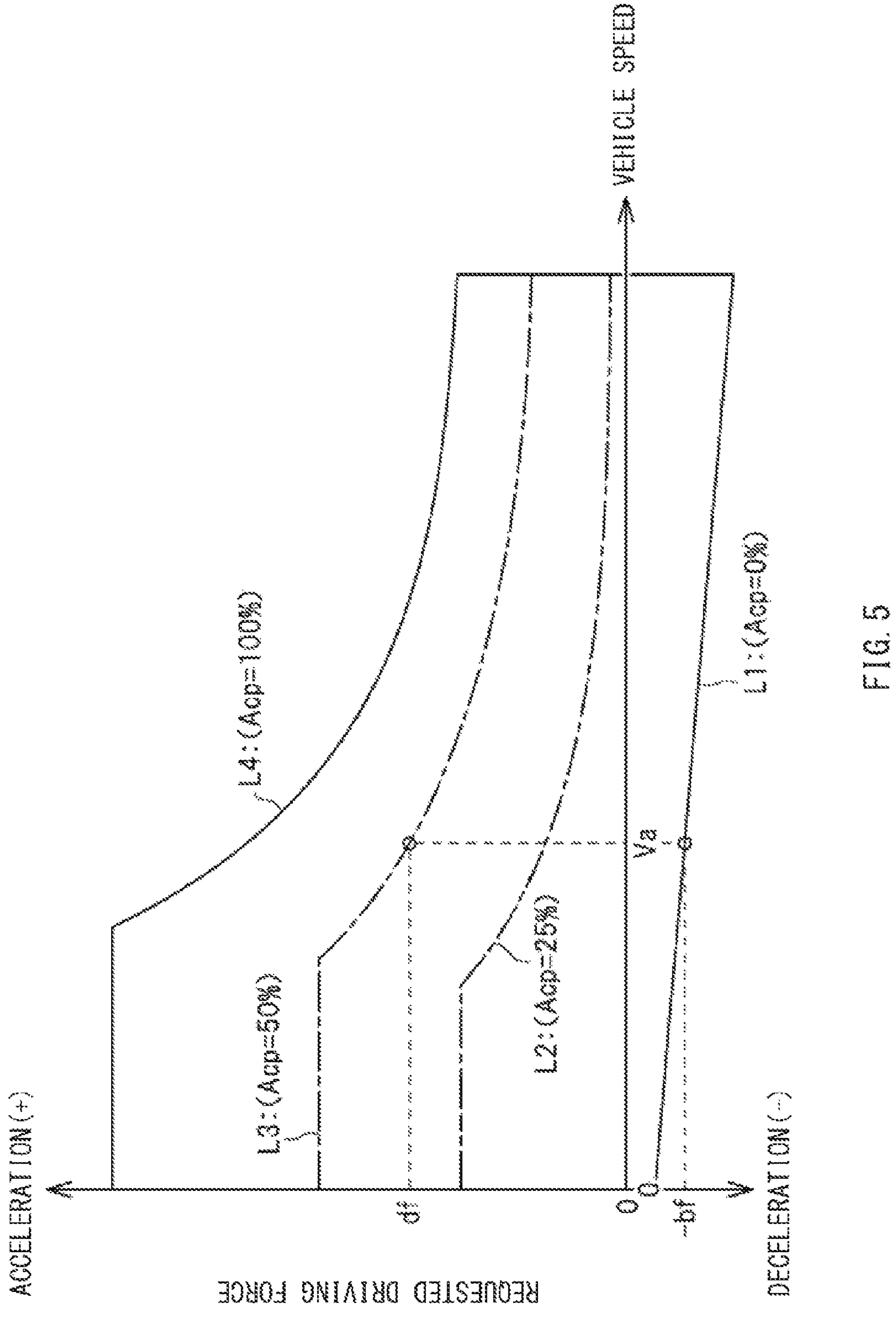
FIG. 5 is a diagram illustrating an example of a driving force map that illustrates a requested driving force.

FIG. 5 is a diagram illustrating an example of a driving force map that illustrates a requested driving force. As illustrated in FIG. 5, characteristic lines L1 to L4 each indicating the requested driving force for the corresponding accelerator position Acp may be set for the driving force map. For example, the vehicle control unit CU4 may set the requested driving force for the vehicle 11 along the characteristic line L1 in a case where the accelerator position Acp is 0%, and may set the requested driving force for the vehicle 11 along the characteristic line L2 in a case where the accelerator position Acp is 25%. Similarly, the vehicle control unit CU4 may set the requested driving force for the vehicle 11 along the characteristic line L3 in a case where the accelerator position Acp is 50%, and may set the requested driving force for the vehicle 11 along the characteristic line L4 in a case where the accelerator position Acp is 100%.

For example, if the accelerator pedal is depressed to bring the accelerator position Acp to "50%" under a situation in which the vehicle speed is "Va", the vehicle control unit CU4 may set "df" as the requested driving force. If the accelerator pedal is released to bring the accelerator position Acp to "0%" under a situation in which the vehicle speed is "Va", the vehicle control unit CU4 may set "−bf" as the requested driving force. Thereafter, the vehicle control unit CU4 may set a target motor torque of the motor generator 12 to allow "df" or "−bf" to be obtained as the requested driving force, and control the motor generator 12 via the motor control unit CU2 to be in the power running state or the regeneration state.

For example, in a case where the requested driving force is set to "df" on the acceleration side, i.e., a positive side, by the depression of the accelerator pedal, the target motor torque of the motor generator 12 may be set on a power running side, and the motor generator 12 may be controlled to be in the power running state. The power running torque of the motor generator 12 may be controlled to allow a total of power-running driving forces transmitted from the motor generator 12 to the rear wheels 18 to reach the requested driving force "df". In contrast, in a case where the requested driving force is set to "−bf" on the deceleration side, i.e., a negative side, by the release of the accelerator pedal, the target motor torque of the motor generator 12 may be set on a regeneration side, and the motor generator 12 may be controlled to be in the regeneration state. The regenerative torque of the motor generator 12 may be controlled to allow a total of regenerative braking forces transmitted from the motor generator 12 to the rear wheels 18 to reach the requested driving force on the negative side, i.e., a requested braking force "−bf". Note that four characteristic lines L1 to L4 are set for the driving force map illustrated in an example of FIG. 5 for easier description, although the number of characteristic lines is not limited thereto. In some embodiments, five or more characteristic lines may be set for the driving force map.

[Regenerative Braking Force and Friction Braking Force in Deceleration Traveling]

A description is given below of the regenerative braking force controlled by the motor generator 12 and the friction braking force controlled by the brake mechanism 30, in deceleration traveling in which an accelerator operation and a brake operation performed by the driver are canceled. In the following description, an increase or decrease in the requested driving force on the negative side, i.e., the requested braking force, may indicate an increase or decrease in an absolute value of the requested braking force. Note that the deceleration traveling in which the accelerator operation and the brake operation are canceled may also be referred to as coasting.

Figure 6:
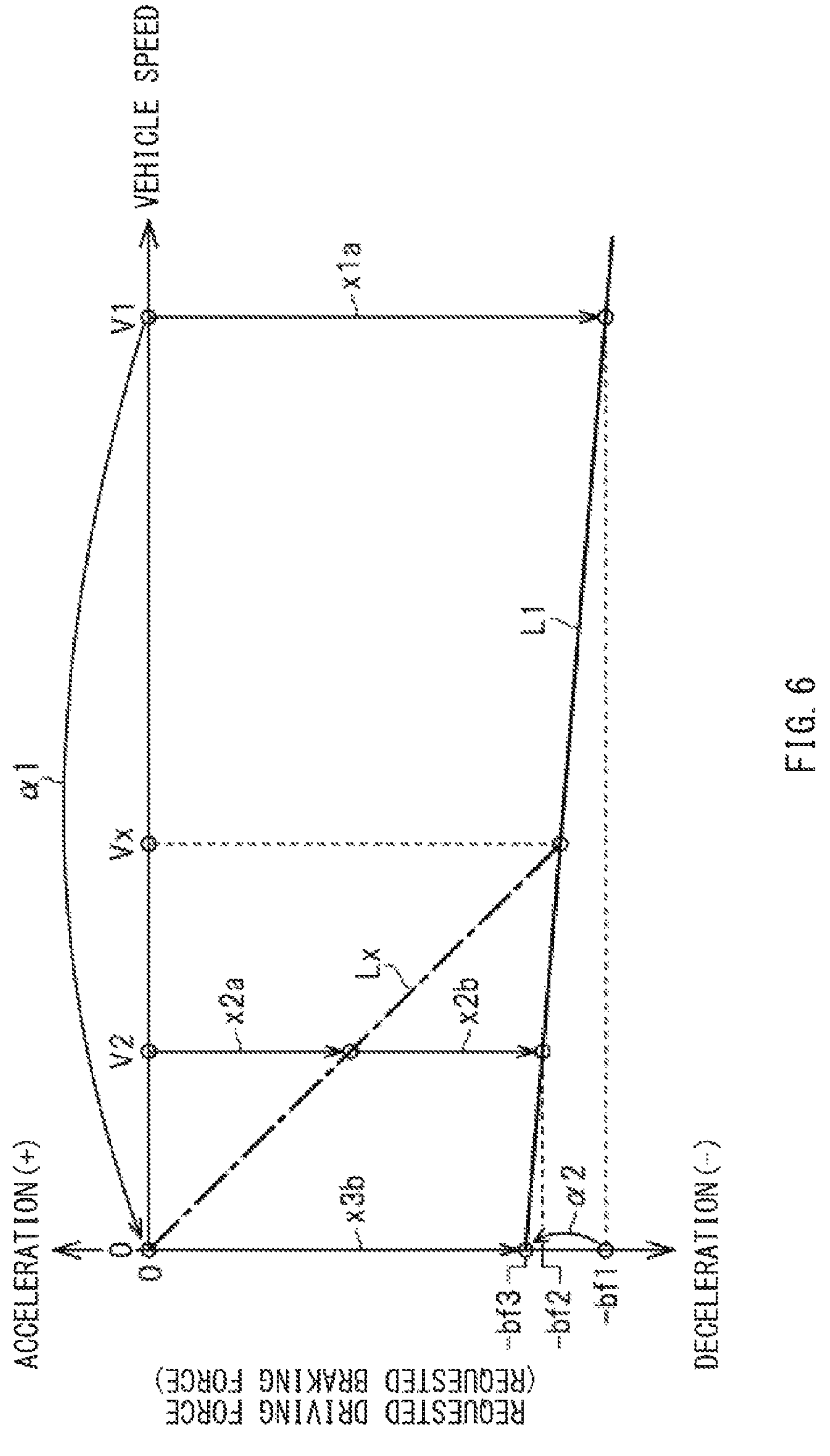
FIG. 6 is an enlarged diagram illustrating a portion of the driving force map illustrated in FIG. 5.

FIG. 6 is an enlarged diagram illustrating a portion of the driving force map illustrated in FIG. 5. As illustrated in FIG. 6, in the deceleration traveling in which the accelerator operation and the brake operation performed by the driver are canceled, the requested driving force on the negative side, i.e., the requested braking force, may be set along the characteristic line L1. In other words, in a case where the vehicle speed decreases from "V1" to "0" as indicated by an arrow $\alpha 1$ in FIG. 6, the requested braking force may decrease from "−bf1" to "−bf3" as indicated by an arrow $\alpha 2$. The motor generator 12 may be controlled to be in the regeneration state during this deceleration traveling, but a rotation speed of the motor generator 12 decreases in a low vehicle speed range. Accordingly, it may be necessary to increase the friction braking force of the brake mechanism 30 with the decrease in the vehicle speed. Hence, in the low vehicle speed range where the vehicle speed is less than a predetermined speed threshold Vx, a characteristic line Lx indicating a magnitude of the regenerative braking force generated by the motor generator 12 may be set. In one embodiment, the speed threshold Vx may serve as a "first threshold". In other words, the requested braking force serving as a target braking force for the front wheels 19 and the rear wheels 18 may be divided, on the basis of the characteristic line Lx, into the regenerative braking force obtained by the motor generator 12 and the friction braking force obtained by the brake mechanism 30.

For example, in a case where the vehicle speed is "V1", all of the requested braking force "−bf1" may be obtained by a regenerative braking force x1a of the motor generator 12. In a case where the vehicle speed is "V2" of the low vehicle speed range, the requested braking force "−bf2" may be obtained by a regenerative braking force x2a of the motor generator 12 and a friction braking force x2b of the brake mechanism 30. In a case where the vehicle speed is "0", all of the requested braking force "−bf3" may be obtained by a friction braking force x3b of the brake mechanism 30. In this manner, in the deceleration traveling performed in the low vehicle speed range where the vehicle speed is less than the speed threshold Vx in a state in which the accelerator operation and the brake operation performed by the driver are canceled, the control system 40 gradually reduces the regenerative braking force of the motor generator 12 with the decrease in the vehicle speed, and gradually increases the friction braking force of the brake mechanism 30 with the decrease in the vehicle speed. In other words, in the deceleration traveling in the low vehicle speed range, switching may be performed, with the decrease in the vehicle speed, from a regenerative brake that performs braking by the regenerative braking force of the motor generator 12 to a friction brake that performs braking by the friction braking force of the brake mechanism 30.

[Deceleration Traveling Control (Timing Chart)]

Figure 7:
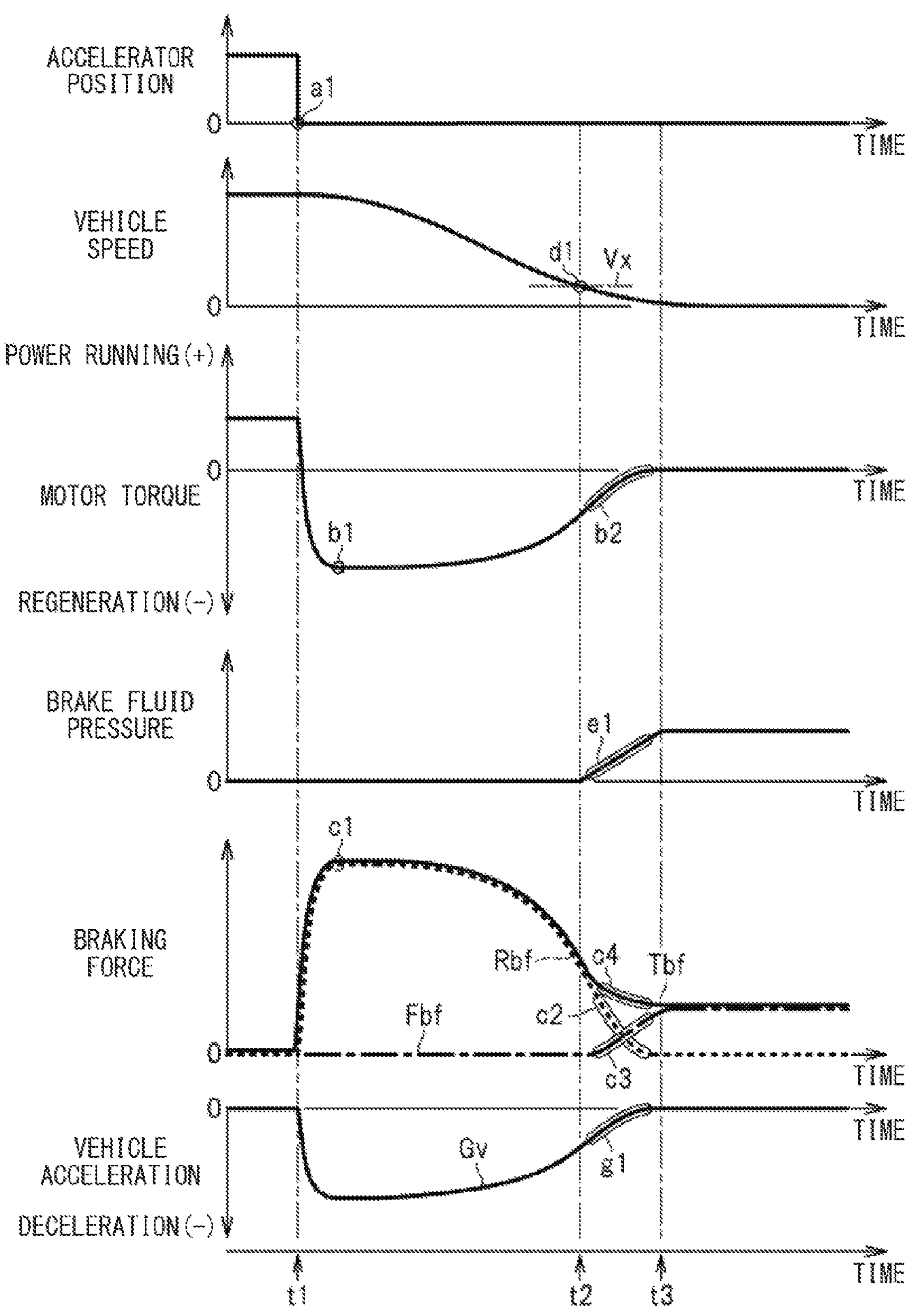
FIG. 7 is a timing chart illustrating an example of a situation in which deceleration traveling control is executed.
Figure 8:
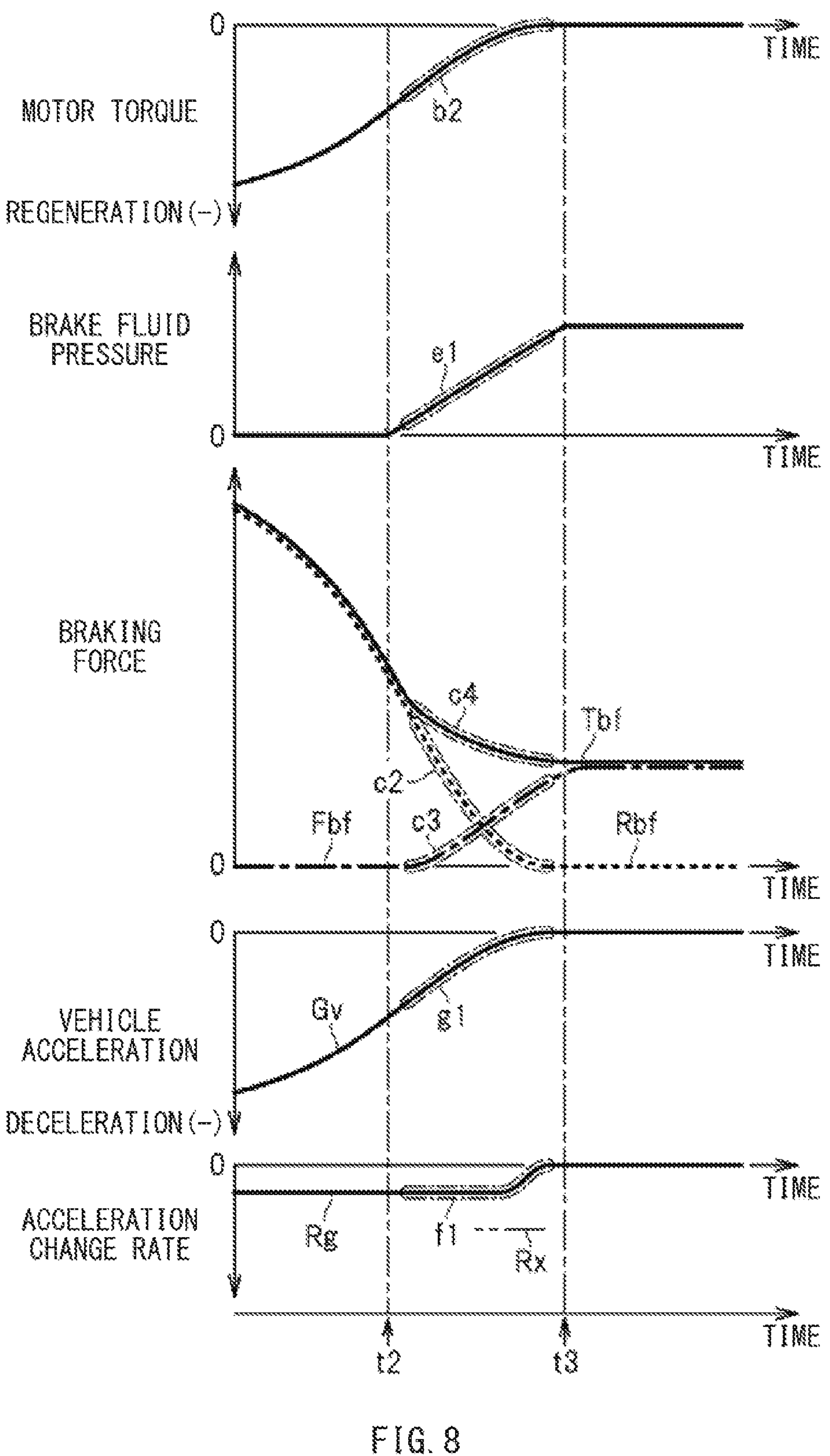
FIG. 8 is an enlarged timing chart illustrating a partial section of the timing chart illustrated in FIG. 7.
Figure 9:
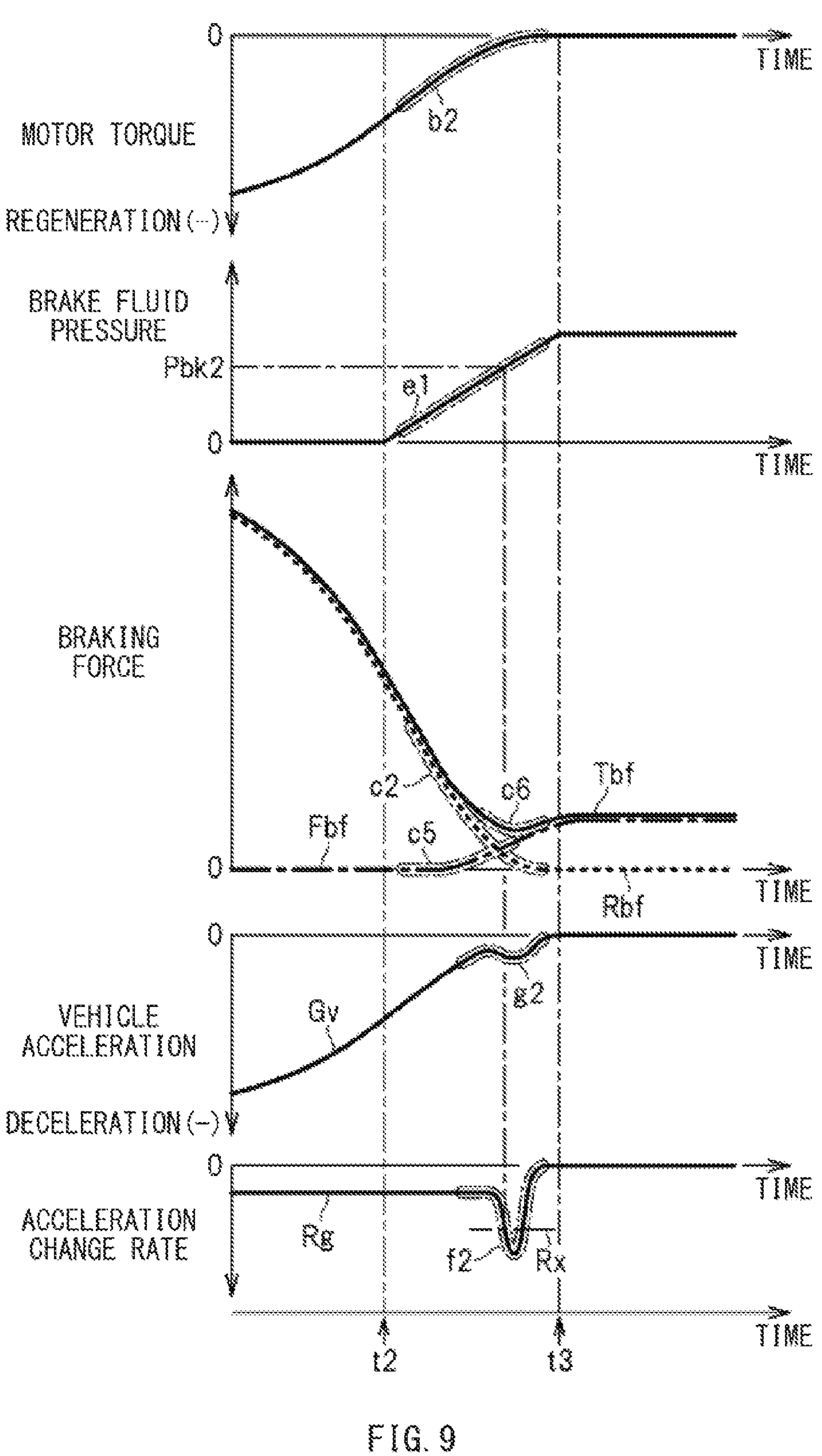
FIG. 9 is a timing chart illustrating an example of a situation in which the deceleration traveling control is executed.

A description is given below of deceleration traveling control performed by the driver canceling the accelerator operation and the brake operation, going through the low vehicle speed range until the vehicle 11 stops. FIG. 7 is a timing chart illustrating an example of a situation in which the deceleration traveling control is executed. FIG. 8 is an enlarged timing chart illustrating a partial section of the timing chart illustrated in FIG. 7. FIG. 9 is a timing chart illustrating an example of a situation in which the deceleration traveling control is executed. FIG. 9 illustrates a section similar to the section of the timing chart illustrated in FIG. 8, and times t2 and t3 illustrated in FIGS. 8 and 9 are the same timings as each other.

FIGS. 7 and 8 illustrate a situation in which switching is performed smoothly from the regenerative brake to the friction brake, and FIG. 9 illustrates a situation in which switching is performed, causing a shock, from the regenerative brake to the friction brake. In FIGS. 7 to 9, as braking forces of the whole vehicle, a regenerative braking force Rbf of the motor generator 12 is indicated by a dashed line, a friction braking force Fbf of the brake mechanism 30 is indicated by a dashed and single-dotted line, and a total braking force Tbf that is the sum of the regenerative braking force Rbf and the friction braking force Fbf is indicated by a solid line. Note that, in the following description, an increase or decrease in the motor torque on the negative side, i.e., the regenerative torque, may indicate an increase or decrease in an absolute value of the regenerative torque.

As indicated at time t1 in FIG. 7, the accelerator operation may be canceled by the driver, and the accelerator position may decrease to "0" (denoted by a reference sign a1). Note that, at time t1, the vehicle 11 may be in a state in which the brake operation performed by the driver has been canceled. In a case where the brake operation and the accelerator operation are thus canceled, the motor torque may be switched from the power running torque to the regenerative torque (denoted by a reference sign b1), and the regenerative braking force Rbf generated by the motor generator 12 may be raised (denoted by a reference sign c1), to allow the total braking force Tbf corresponding to the target or requested braking force to be obtained. Thereafter, as indicated at time t2, when the vehicle speed decreases to fall below the speed threshold Vx (denoted by a reference sign d1), switching from the regenerative brake to the friction brake may be started toward a vehicle stop.

For example, as illustrated in FIG. 8, the control system 40 may increase the friction braking force Fbf by increasing the brake fluid pressure of the brake mechanism 30 (denoted by reference signs e1 and c3), while reducing the regenerative braking force Rbf by reducing the regenerative torque of the motor generator 12 (denoted by reference signs b2 and c2). This makes it possible to gently change the total braking force Tbf toward the vehicle stop (denoted by a reference sign c4), allowing a smooth transition from the regenerative brake to the friction brake. In other words, it is possible to gently change a vehicle acceleration Gv applied in the front-rear direction of the vehicle (denoted by a reference sign g1), to prevent a change rate of the vehicle acceleration Gv from exceeding a predetermined determination threshold Rx (denoted by a reference sign f1). The change rate of the vehicle acceleration Gv may hereinafter be referred to as an acceleration change rate Rg. In one embodiment, the determination threshold Rx may serve as a "second threshold". This makes it possible to stop the vehicle 11 without giving the driver a feeling of strangeness.

As described above, to gently change the vehicle acceleration Gv in switching from the regenerative brake to the friction brake, it may be necessary to accurately increase the friction braking force Fbf in accordance with the decrease in the regenerative braking force Rbf. To enhance control accuracy of the friction braking force Fbf, it may be necessary to enhance accuracy of the correlation data regarding the friction braking force and the brake fluid pressure. For example, in a case where, as indicated by a dashed line Xb in FIG. 3, the friction braking force obtained by the brake fluid pressure indicated to the brake actuator 35 becomes smaller than the original characteristic line Xa due to a cause such as a change over time, a shock can be caused upon the switching from the regenerative brake to the friction brake.

In other words, in a case where the friction braking force obtained by the brake fluid pressure becomes smaller than the characteristic line Xa as indicated by the dashed line Xb in FIG. 3, a rise of the friction braking force Fbf generated at the brake mechanism 30 is delayed with respect to the increase in the brake fluid pressure controlled by the brake actuator 35, as denoted by reference signs e1 and c5 in FIG. 9. In this case, it is difficult to compensate for the decrease in the regenerative braking force Rbf with the increase in the friction braking force Fbf, which causes the total braking force Tbf to temporarily drop (denoted by a reference sign c6). This causes the vehicle acceleration Gv to excessively fluctuate (denoted by a reference sign g2), and the acceleration change rate Rg to fluctuate beyond the determination threshold Rx (denoted by a reference sign f2), which can give the driver a feeling of strangeness. Hence, to enhance the control accuracy of the friction braking force Fbf, the control system 40 may execute data correction control of correcting the correlation data.

[Data Correction Control]

Figure 10:
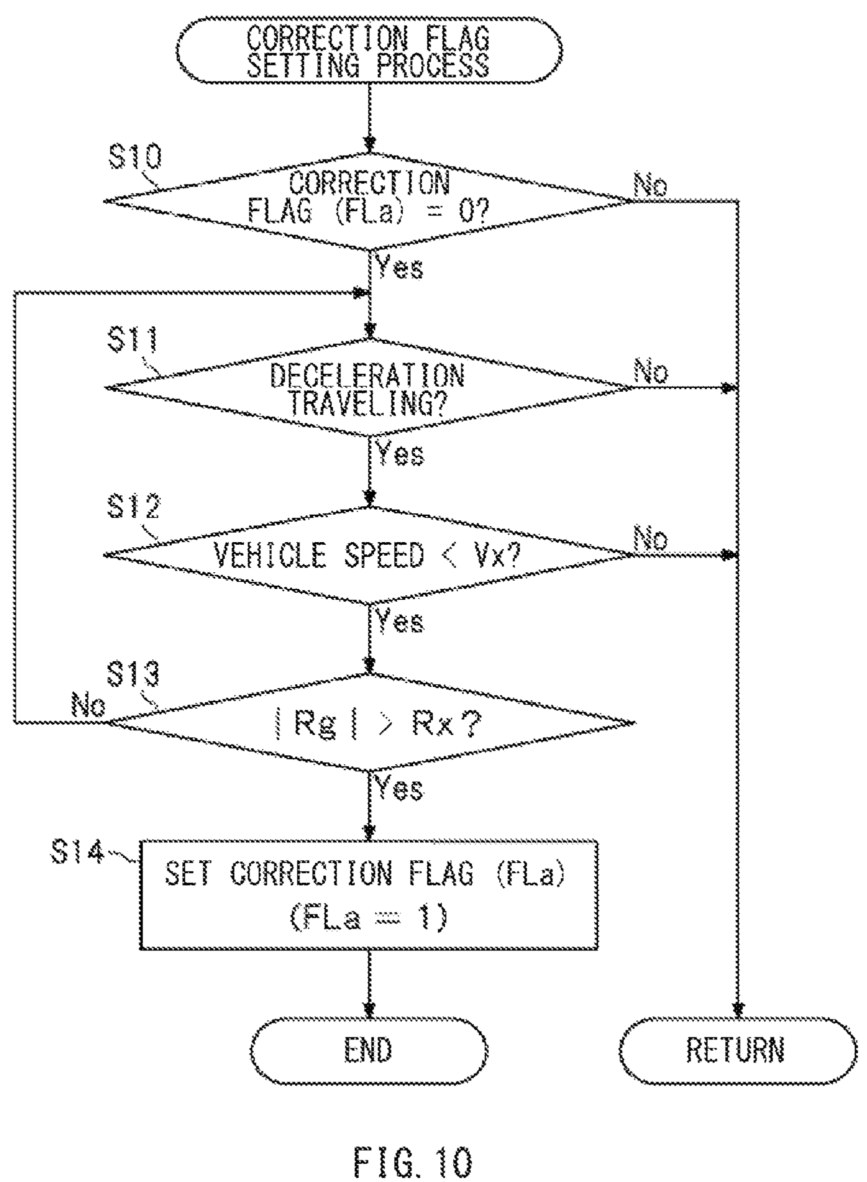
FIG. 10 is a flowchart illustrating an example of a procedure of executing a correction flag setting process included in data correction control.
Figure 11:
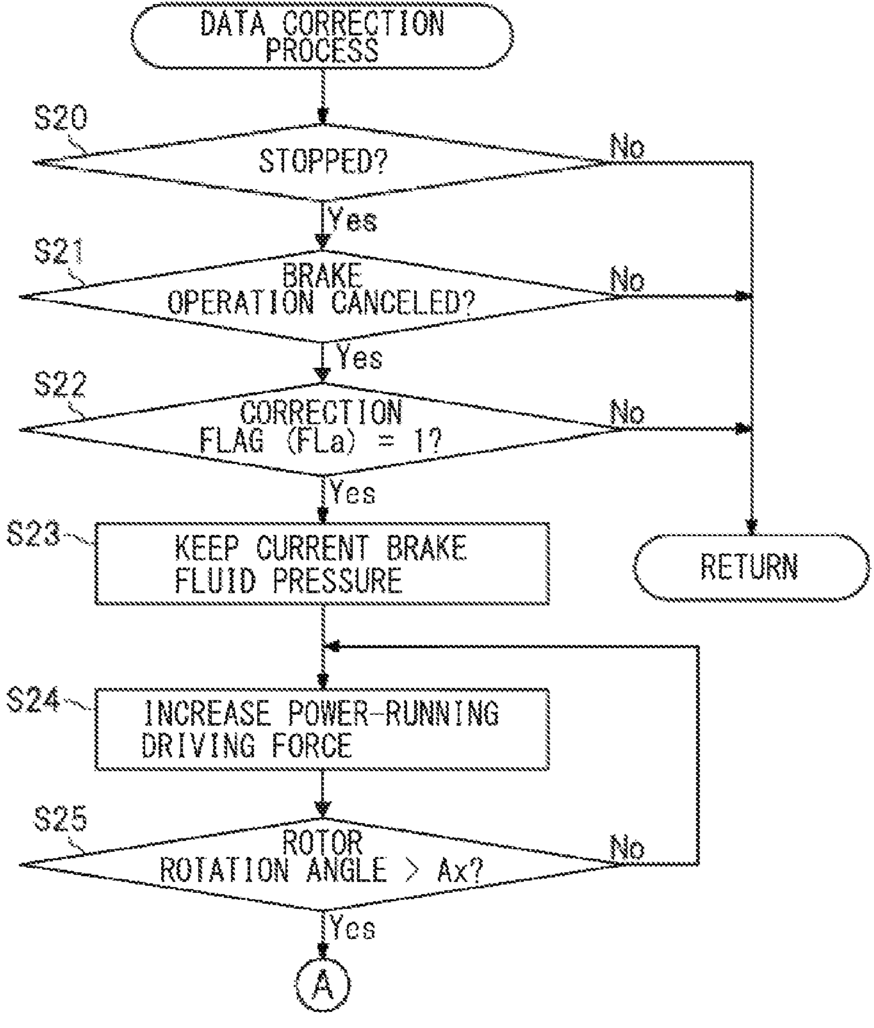
FIG. 11 is a flowchart illustrating an example of a procedure of executing a data correction process included in the data correction control.
Figure 12:
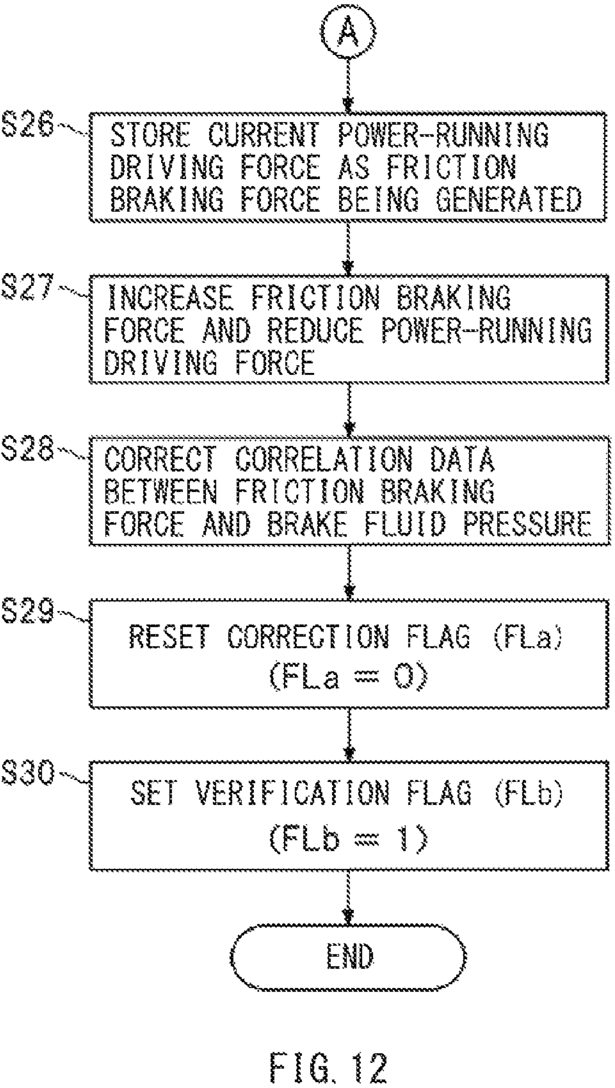
FIG. 12 is a flowchart illustrating the example of the procedure of executing the data correction process included in the data correction control.

A description is given below of the data correction control of correcting the correlation data. FIG. 10 is a flowchart illustrating an example of a procedure of executing a correction flag setting process included in the data correction control. FIGS. 11 and 12 are flowcharts illustrating an example of a procedure of executing a data correction process included in the data correction control. The flowcharts of FIGS. 11 and 12 may be coupled to each other at a point A. Each step in the flowcharts illustrated in FIGS. 10 to 12 may be performed by the processor 60 in the control system 40. The data correction control may be executed by the control system 40 for each predetermined cycle, after the start switch 58 is operated by the driver and the control system 40 configured by the control units including, for example, the vehicle control unit CU4, is thereby started up.

[Correction Flag Setting Process]

As illustrated in FIG. 10, in step S10, the control system 40 may determine whether a correction flag FLa is set at "0". The correction flag FLa may be a control flag to be used in determining whether the correlation data has to be corrected. The control system 40 may set the correction flag FLa to "1" upon determining that the correlation data has to be corrected, and set the correction flag FLa to "0" upon determining that the correlation data does not have to be corrected. If the control system 40 determines in step S10 that the correction flag FLa is set at "0" (step S10: Yes), the control system 40 may cause the procedure to proceed to step S11, and determine whether the deceleration traveling in which the accelerator operation and the brake operation performed by the driver are canceled is ongoing.

If the control system 40 determines in step S11 that the deceleration traveling is ongoing (step S11: Yes), the control system 40 may cause the procedure to proceed to step S12, and determine whether the vehicle speed is in the low vehicle speed range below the speed threshold Vx. If the control system 40 determines in step S12 that the vehicle speed is in the low vehicle speed range below the speed threshold Vx (step S12: Yes), the control system 40 may cause the procedure to proceed to step S13, and determine whether an absolute value of the acceleration change rate Rg is greater than the determination threshold Rx. If the control system 40 determines in step S13 that the acceleration change rate Rg is greater than the determination threshold Rx (step S13: Yes), the control system 40 may cause the procedure to proceed to step S14, and set the correction flag FLa to "1".

A situation in which the acceleration change rate Rg is determined as being greater than the determination threshold Rx in step S13 may be a situation in which, as described with reference to FIG. 9, a shock is caused upon the switching from the regenerative brake to the friction brake in the deceleration traveling in the low vehicle speed range. In other words, the control accuracy of the friction braking force Fbf by the brake mechanism 30 can be degraded. Accordingly, to start the data correction process of correcting the correlation data, the correction flag FLa may be set to "1" by the control system 40. In other words, the control system 40 starts the data correction process to be described later by using, as a trigger, a situation in which the acceleration change rate Rg exceeds the determination threshold Rx.

[Data Correction Process]

As illustrated in FIG. 11, in step S20, the control system 40 may determine whether the vehicle is stopped. If the control system 40 determines in step S20 that the vehicle is stopped (step S20: Yes), the control system 40 may cause the procedure to proceed to step S21, and determine whether the brake operation performed by the driver has been canceled. If the control system 40 determines in step S21 that the brake pedal 31 is not depressed, i.e., that the vehicle is in a stopped state in which the brake operation is not performed (step S21: Yes), the control system 40 may cause the procedure to proceed to step S22, and determine whether the correction flag FLa is set at "1". Note that the stopped state in which the brake operation is not performed may be a state in which, as illustrated in FIG. 3, the vehicle stop is kept by the friction braking force x3b of the brake mechanism 30.

In the state in which the vehicle stop is thus kept by the friction braking force x3b of the brake mechanism 30, if the control system 40 determines in step S22 that the correction flag FLa is set at "1" (step S22: Yes), the control system 40 may estimate a relationship between the brake fluid pressure and the friction braking force obtained by the brake fluid pressure, to correct the correlation data between the brake fluid pressure and the friction braking force. For example, the control system 40 may keep the current brake fluid pressure by means of the brake actuator 35 in step S23, and gradually raise the power-running driving force of the motor generator 12 by means of the inverter 20 in subsequent step S24. In subsequent step S25, the control system 40 may determine whether the rotor rotation angle of the motor generator 12 is greater than a predetermined determination threshold Ax.

The determination threshold Ax to be compared with the rotor rotation angle in step S25 may be set to a value that allows for detection of rotation of the disc rotor 33 restrained by the caliper 34. For example, a situation in which the rotor rotation angle exceeds the determination threshold Ax in step S25 may be a situation in which, by the power-running driving force reaching the friction braking force being generated, the disc rotor 33 restrained by the caliper 34 begins to rotate at a predetermined angle, i.e., a situation in which the vehicle 11 begins to start. Note that, in the above description, it may be determined whether the vehicle speed changes on the basis of the rotor rotation angle from the motor rotation sensor 59. However, this is non-limiting. It may be determined whether the vehicle starts on the basis of the wheel speeds detected by the wheel speed sensors 54 to 57.

If the control system 40 determines in step S25 that the rotor rotation angle is greater than the determination threshold Ax (step S25: Yes), as illustrated in FIG. 12, the control system 40 may cause the procedure to proceed to step S26, and store the current power-running driving force as the friction braking force being generated. Thereafter, the control system 40 may increase the friction braking force and reduce the power-running driving force to keep the stopped state in step S27, and correct the correlation data between the brake fluid pressure and the friction braking force in step S28. For example, in step S28, the control system 40 may correct the correlation data on the basis of the brake fluid pressure kept in step S23 and the friction braking force stored in step S26. After the correlation data is thus corrected, the control system 40 may cause the procedure to proceed to step S29, and reset the correction flag FLa to "0". The control system 40 may thereafter cause the procedure to proceed to step S30, and set a verification flag FLb to "1". Note that the verification flag FLb may be a control flag to be used in determining whether to execute a data verification process to be described later. The control system 40 may set the verification flag FLb to "1" upon determining that the data verification process has to be executed, and set the verification flag FLb to "0" upon determining that the data verification process does not have to be executed.

Figure 13:
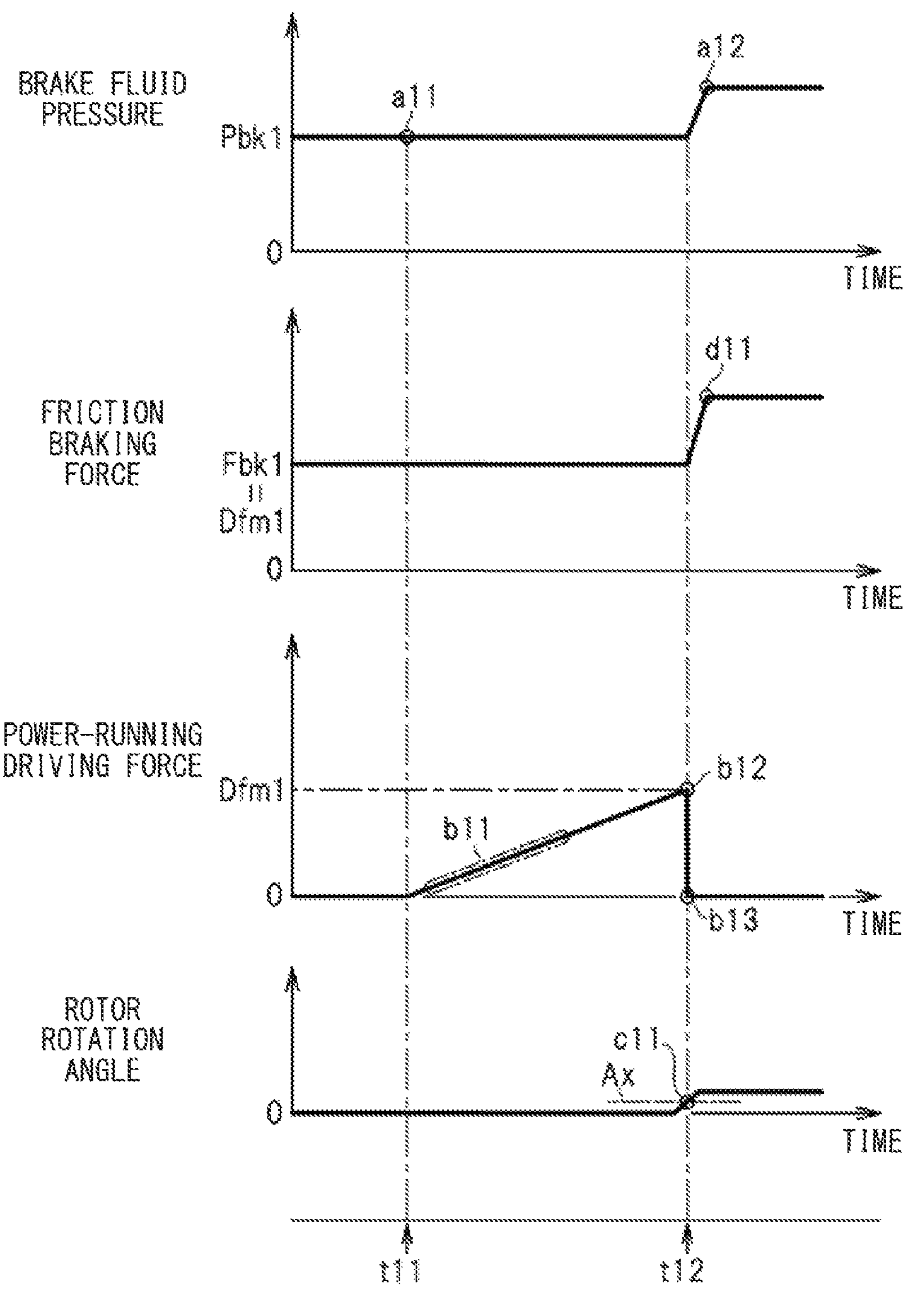
FIG. 13 is a timing chart illustrating an example of a situation in which the data correction process is executed.
Figure 14:
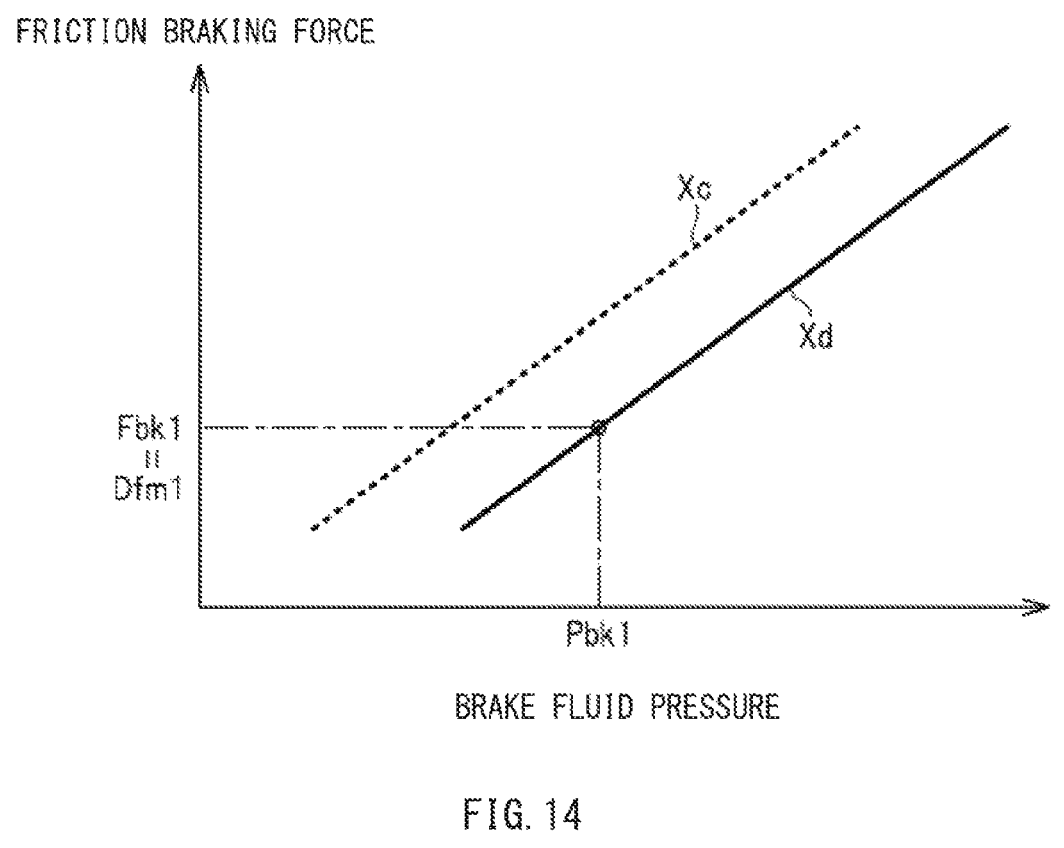

FIG. 13 is a timing chart illustrating an example of a situation in which the data correction process is executed. FIG. 14 is a diagram illustrating an example of a situation in which the correlation data is corrected. As indicated at time t11 in FIG. 13, in the stopped state in which the brake operation is not performed by the driver, the brake fluid pressure outputted from the brake actuator 35 may be kept at the current value "Pbk1" (denoted by a reference sign a11), and the power-running driving force of the motor generator 12 may be gradually increased (denoted by a reference sign b11). In other words, the control system 40 may gradually raise the power-running driving force of the motor generator 12, while keeping the stopped state by the brake fluid pressure Pbk1.

Thereafter, as indicated at time t12, when the rotor rotation angle exceeds the determination threshold Ax (denoted by a reference sign c11), the current power-running driving force "Dfm1" may be stored as the friction braking force being generated. In other words, the control system 40 may store "Dfm1" as the current friction braking force "Fbk1". Thereafter, to keep the stopped state, the friction braking force may be increased by increasing the brake fluid pressure (denoted by reference signs a12 and d11), and the power-running driving force of the motor generator 12 may be reduced (denoted by a reference sign b13). In a case where the friction braking force of the brake mechanism 30 is thus estimated on the basis of the power-running driving force, as illustrated in FIG. 14, the control system 40 may correct the correlation data from an original characteristic line Xc to a new characteristic line Xd, to allow the friction braking force Fbk1 to be obtained by the brake fluid pressure Pbk1.

Figure 15:
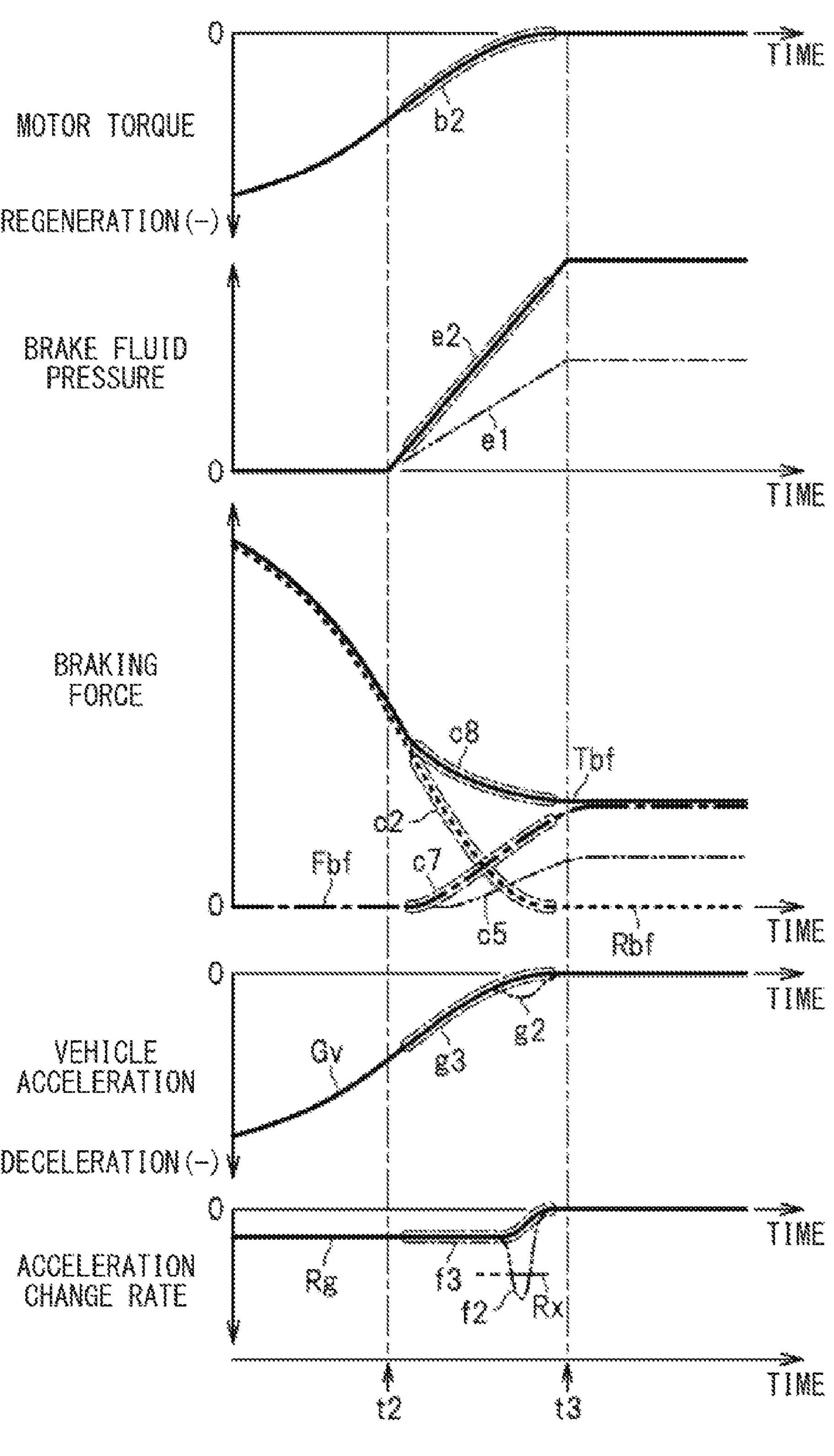
FIG. 15 is a timing chart illustrating an example of a situation in which the deceleration traveling control is executed after the correlation data is corrected.

Thus correcting the correlation data enables the control system 40 to accurately control the friction braking force of the brake mechanism 30, which makes it possible to suppress a shock caused upon the switching from the regenerative brake to the friction brake. FIG. 15 is a timing chart illustrating an example of a situation in which the deceleration traveling control is executed after the correlation data is corrected. FIG. 15 illustrates a section similar to the section of the timing chart illustrated in FIG. 9, and times t2 and t3 illustrated in FIGS. 9 and 15 are the same timings as each other.

In a case where the correlation data is corrected, as denoted by a reference sign e2 in FIG. 15, it is possible to control the brake fluid pressure higher on the basis of the correlation data, as compared with an example denoted by the reference sign e1 in FIG. 9. Thus, as denoted by a reference sign c7 in FIG. 15, it is possible to raise the friction braking force Fbf of the brake mechanism 30 quickly, as compared with an example denoted by the reference sign c5 in FIG. 9. In other words, it is possible to appropriately compensate for the decrease in the regenerative braking force Rbf with the increase in the friction braking force Fbf, which makes it possible to gently change the total braking force Tbf (denoted by a reference sign c8). This makes it possible to gently change the vehicle acceleration Gv (denoted by a reference sign g3), to prevent the acceleration change rate Rg from exceeding the determination threshold Rx (denoted by a reference sign f3). This makes it possible to stop the vehicle 11 without giving the driver a feeling of strangeness.

[Data Verification Process]

Figure 16:
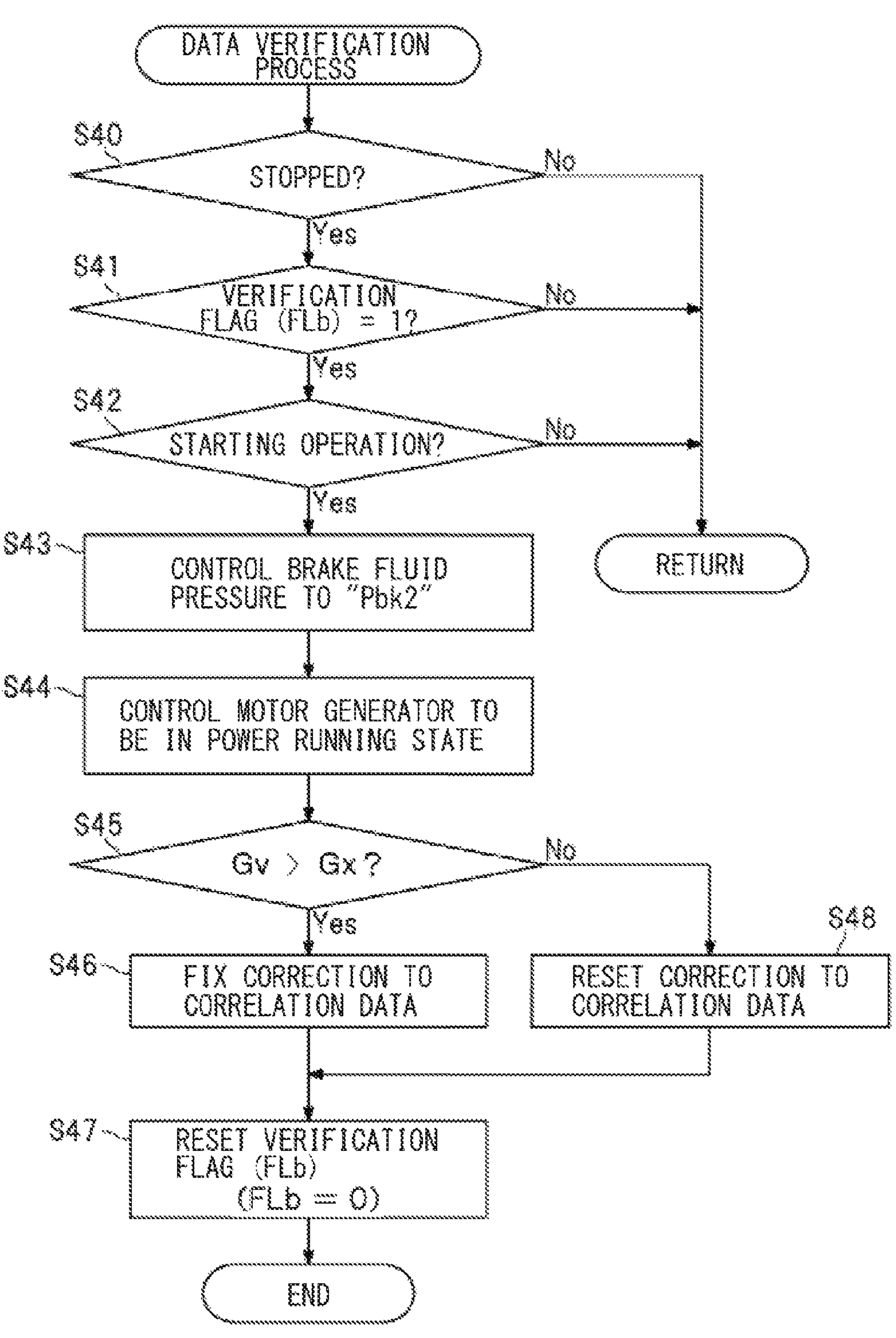
FIG. 16 is a flowchart illustrating an example of a procedure of executing a data verification process included in the data correction control.

A description is given below of the data verification process of verifying a content of correction for the correlation data. FIG. 16 is a flowchart illustrating an example of a procedure of executing the data verification process included in the data correction control. Each step in the flowchart illustrated in FIG. 16 may be performed by the processor 60 in the control system 40.

As illustrated in FIG. 16, in step S40, the control system 40 may determine whether the vehicle is stopped. If the control system 40 determines in step S40 that the vehicle is stopped (step S40: Yes), the control system 40 may cause the procedure to proceed to step S41, and determine whether the verification flag FLb is set at "1". If the control system 40 determines in step S41 that the verification flag FLb is "1" (step S41: Yes), the control system 40 may cause the procedure to proceed to step S42, and determine whether a starting operation is performed by the driver. Examples of the starting operation performed by the driver may include an operation of depressing the accelerator pedal and an operation of releasing the brake pedal 31.

If the control system 40 determines in step S42 that the starting operation is performed by the driver (step S42: Yes), the control system 40 may cause the procedure to proceed to step S43, and control the brake fluid pressure to a control instruction value "Pbk2". In one embodiment, the control instruction value "Pbk2" may serve as a "verifying instruction value". The control system 40 may thereafter cause the procedure to proceed to step S44, and control the motor generator 12 to be in a predetermined power running state. "Pbk2" indicated to the brake mechanism 30 in step S43 may be, as illustrated in FIG. 9, the brake fluid pressure indicated to the brake mechanism 30 in a situation in which the acceleration change rate Rg exceeds the determination threshold Rx. In other words, "Pbk2" may be the brake fluid pressure indicated to the brake mechanism 30 in a situation in which the friction braking force Fbf of the brake mechanism 30 is not sufficiently raised in the deceleration traveling in the low vehicle speed range.

In this manner, in the data verification process, the control system 40 may cause the vehicle 11 to start by the power running torque of the motor generator 12, while operating the brake mechanism 30 by the brake fluid pressure Pbk2. In step S45, the control system 40 may determine whether the vehicle acceleration Gv at the time when the vehicle starts is greater than a predetermined determination threshold Gx. In one embodiment, the determination threshold Gx may serve as a "third threshold". A situation in which the vehicle acceleration Gv exceeds the determination threshold Gx in step S45 may be a situation in which the vehicle 11 starts without being impeded, although the brake mechanism 30 is operated by the brake fluid pressure Pbk2. In other words, this situation may be a situation in which the friction braking force of the brake mechanism 30 is not sufficiently raised by the brake fluid pressure Pbk2 indicated to the brake mechanism 30. In this case (step S45: Yes), it may be assumed that shortage of the friction braking force has been caused by inadequacy in the correlation data. Accordingly, the control system 40 may cause the procedure to proceed to step S46, and fix the content of the correction already made to the correlation data. Thereafter, the control system 40 may cause the procedure to proceed to step S47, set the verification flag FLb to "0", and exit the routine.

A situation in which the vehicle acceleration Gv is equal to or less than the determination threshold Gx, i.e., a situation in which the vehicle acceleration Gv does not exceed the determination threshold Gx, in step S45 may be a situation in which the vehicle 11 starts while being impeded by the brake mechanism 30 being operated by the brake fluid pressure Pbk2. In other words, this situation may be a situation in which the friction braking force of the brake mechanism 30 is sufficiently raised by the brake fluid pressure Pbk2 indicated to the brake mechanism 30. In this case (step S45: No), it may be assumed that a reason why the acceleration change rate Rg has exceeded the determination threshold Rx is not inadequacy in the correlation data, but a change in acceleration due to passage over a step, for example. Accordingly, the control system 40 may cause the procedure to proceed to step S48, and cancel the content of the correction already made to the correlation data, to return the correlation data to the correlation data before the making of the correction. Thereafter, the control system 40 may cause the procedure to proceed to step S47, set the verification flag FLb to "0", and exit the routine.

Other Example Embodiment (Data Correction Process)

Figure 17:
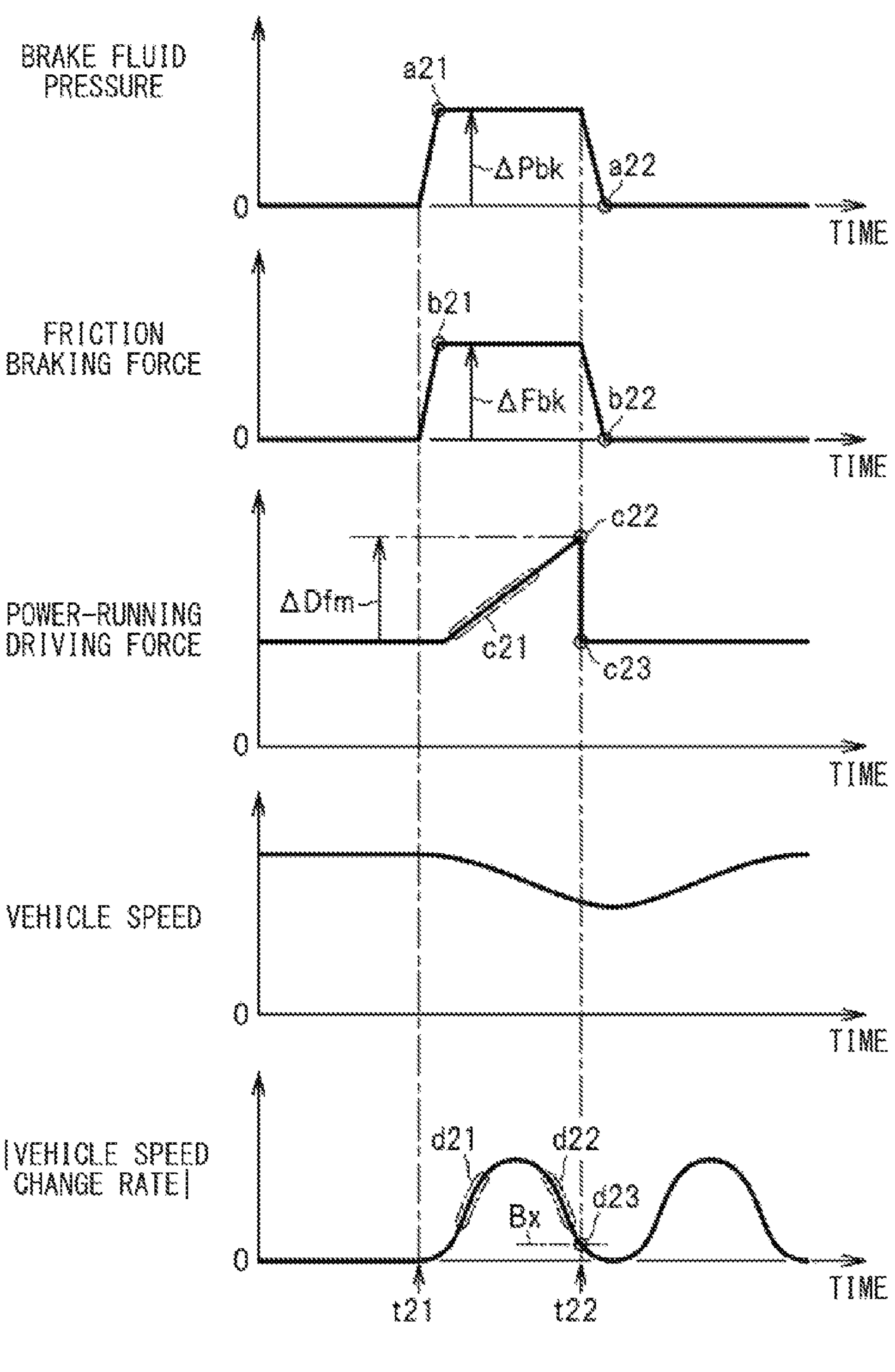
FIG. 17 is a timing chart illustrating another example of a situation in which the data correction process is executed.

In the example illustrated in FIG. 13, the control system 40 may execute the data correction process in the stopped state after the acceleration change rate Rg exceeds the determination threshold Rx. However, this is non-limiting. The data correction process may be executed in a constant-speed traveling state after the acceleration change rate Rg exceeds the determination threshold Rx. FIG. 17 is a timing chart illustrating another example of a situation in which the data correction process is executed. As indicated at time t21 in FIG. 17, in the constant-speed traveling state in which the vehicle speed is kept constant, the control system 40 may raise the brake fluid pressure of the brake mechanism 30 by a predetermined amount of change ΔPbk (denoted by a reference sign a21), to raise the friction braking force of the brake mechanism 30 by a predetermined amount of change ΔFbk (denoted by a reference sign b21). In other words, the brake fluid pressure may be raised in an increase direction of the friction braking force. While the raised brake fluid pressure is kept, the power-running driving force of the motor generator 12 may be gradually increased (denoted by a reference sign c21).

By the brake fluid pressure and the power-running driving force thus being controlled, the increase in the brake fluid pressure may cause the vehicle speed to temporarily decrease, but the increase in the power-running driving force may cause the decrease in the vehicle speed to stop. In other words, the increase in the brake fluid pressure may cause an absolute value of a vehicle speed change rate to increase (denoted by a reference sign d21), but the subsequent increase in the power-running driving force may cause the absolute value of the vehicle speed change rate to decrease (denoted by a reference sign d22). Thereafter, as indicated at time t22, when the absolute value of the vehicle speed change rate falls below a predetermined determination threshold Bx (denoted by a reference sign d23), the current amount of change "ΔDfm" of the power-running driving force may be stored as the amount of change ΔFbk of the friction braking force being generated (denoted by a reference sign c22). In other words, the control system 40 may store "ΔDfm" as the current amount of change "ΔFbk" of the friction braking force. Thereafter, to return the vehicle to the latest constant-speed traveling state, the friction braking force may be reduced by reducing the brake fluid pressure (denoted by reference signs a22 and b22), and the power-running driving force of the motor generator 12 may be reduced (denoted by a reference sign c23).

As described above, the control system 40 may estimate that the amount of change ΔDfm of the power-running driving force in a situation in which the decrease in the vehicle speed stops is the amount of change ΔFbk of the friction braking force generated at the brake mechanism 30. The control system 40 may correct the correlation data, on the basis of the amount of change ΔFbk of the friction braking force estimated on the basis of the amount of change ΔDfm of the power-running driving force, and the amount of change ΔPbk of the brake fluid pressure in the situation in which the decrease in the vehicle speed stops. Also in a case where the correlation data is thus corrected, the control system 40 is able to accurately control the friction braking force of the brake mechanism 30, which makes it possible to suppress a shock caused upon the switching from the regenerative brake to the friction brake. Note that, in the example illustrated in FIG. 17, in the data correction process, the power-running driving force may be gradually increased until the decrease in the vehicle speed stops, while keeping the increased brake fluid pressure. However, this is non-limiting. For example, in the constant-speed traveling state, the brake fluid pressure may be gradually increased until an increase in the vehicle speed stops, while keeping the power-running driving force increased by a predetermined amount of change.

CONCLUSION

As described above, in the deceleration traveling performed in the low vehicle speed range where the vehicle speed is less than the speed threshold Vx in a state in which the accelerator operation and the brake operation performed by the driver are canceled, the control system 40 increases the friction braking force of the brake mechanism 30 while reducing the regenerative braking force of the motor generator 12. The control system 40 corrects the correlation data between the brake fluid pressure, serving as the control instruction value, indicated to the brake mechanism 30 and the friction braking force generated by the indicated brake fluid pressure, by using, as a trigger, a situation in which the change rate Rg of the vehicle acceleration Gv exceeds the determination threshold Rx in the deceleration traveling in the low vehicle speed range. This makes it possible to enhance the accuracy of the correlation data, which helps to enhance the control accuracy of the friction braking force.

The control system 40 may correct the correlation data in the stopped state after the change rate Rg of the vehicle acceleration Gv exceeds the determination threshold Rx. For example, in the stopped state in which the brake mechanism 30 operates, the control system 40 may increase the power-running driving force while keeping the brake fluid pressure.

The control system 40 may thus estimate that the power-running driving force in a situation in which the vehicle 11 begins to start is the friction braking force generated at the brake mechanism 30. The control system 40 may correct the correlation data on the basis of the friction braking force estimated on the basis of the power-running driving force, and the brake fluid pressure in the situation in which the vehicle 11 begins to start. In the example illustrated in FIG. 13, in the data correction process, the power-running driving force may be gradually increased until the vehicle 11 begins to start, while keeping the brake fluid pressure in the stopped state. However, this is non-limiting. For example, in the stopped state, the brake fluid pressure may be gradually reduced until the vehicle 11 begins to start, with the power-running driving force raised to a predetermined value and kept.

To execute the data verification process, at the time when the vehicle starts after the correlation data is corrected, the control system 40 may cause the vehicle 11 to start while operating the brake mechanism 30. In a case where the vehicle acceleration Gv at the time when the vehicle starts is greater than the determination threshold Gx, the control system 40 may fix the content of the correction for the correlation data. In a case where the vehicle acceleration Gv at the time when the vehicle starts is equal to or less than the determination threshold Gx, the control system 40 may cancel the content of the correction for the correlation data. In addition, to execute the data verification process, the control system 40 may indicate the brake fluid pressure serving as the verifying instruction value to the brake mechanism 30 at the time when the vehicle starts after the correlation data is corrected. The brake fluid pressure serving as the verifying instruction value may be the brake fluid pressure indicated to the brake mechanism 30 in a situation in which the change rate Rg of the vehicle acceleration Gv exceeds the determination threshold Rx in the deceleration traveling in the low vehicle speed range. This makes it possible to appropriately correct the correlation data.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

In the above description, the vehicle control apparatus 10 may be applied to an electric vehicle, serving as the vehicle, including only the motor generator 12 as a power source. However, this is non-limiting. The vehicle control apparatus 10 may be applied to a hybrid vehicle including a motor generator and an engine as power sources. In the illustrated example, the vehicle 11 may be equipped with one motor generator 12. However, this is non-limiting. The vehicle 11 may be equipped with multiple motor generators 12. Further, a so-called in-wheel motor provided on any of the front wheels 19 and the rear wheels 18 may be used as the motor generator 12.

In the above description, a hydraulic brake mechanism including the caliper 34 that is operated by the brake fluid pressure may be used as the brake mechanism 30. However, this is non-limiting. An electric brake mechanism including a part such as a caliper that is operated by an electric motor may be used. In the electric brake mechanism, it is possible to control the friction braking force by controlling, for example, the number of revolutions of the electric motor. Accordingly, for example, the target number of revolutions transmitted from the brake control unit CU3 to the electric motor may serve as the control instruction value. In the illustrated example, the brake mechanism 30 may brake both the front wheels 19 and the rear wheels 18. However, this is non-limiting. The brake mechanism 30 may brake either or both of the front wheels 19 and the rear wheels 18. For example, the brake mechanism 30 may brake only the front wheels 19, or the brake mechanism 30 may brake only the rear wheels 18. Further, in the above description, the control system 40 may be configured by the multiple control units CU1 to CU4. However, this is non-limiting. For example, the control system 40 may be configured by a single control unit.

In the example illustrated in FIG. 10, the correction flag FLa may be set to "1" in a case where the acceleration change rate Rg is greater than the determination threshold Rx. However, this is non-limiting. For example, the correction flag FLa may be set to "1" in a case where a change rate of the wheel speed or a motor rotation speed is greater than a predetermined determination threshold. In other words, it may be determined that the acceleration change rate Rg is greater than the determination threshold Rx in a case where the change rate of the wheel speed is greater than a predetermined determination threshold, or in a case where the change rate of the motor rotation speed is greater than a predetermined determination threshold. Further, in the example illustrated in FIG. 11, the relationship between the brake fluid pressure and the friction braking force obtained by the brake fluid pressure may be estimated in the stopped state in which the brake operation is not performed by the driver. However, this is non-limiting. The relationship between the brake fluid pressure and the friction braking force obtained by the brake fluid pressure may be estimated in the stopped state in which the brake operation is performed by the driver. In this case, the power-running driving force of the motor generator 12 may be raised more greatly than in the stopped state in which the brake operation is not performed.

The control system 40 illustrated in FIGS. 1 and 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control system 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control system 40 illustrated in FIGS. 1 and 2.

The invention claimed is:

1. A vehicle control apparatus to be applied to a vehicle, the vehicle control apparatus comprising:

an electric motor (i) coupled to one or both of a first wheel and a second wheel of the vehicle and (ii) configured to generate a driving force comprising a regenerative braking force in accordance with a first target value indicated by a first signal;

a brake mechanism (i) configured to brake one or both of the first wheel and the second wheel and (ii) configured to generate a friction braking force in accordance with a second target value indicated by a second signal; and a control system (i) comprising a processor and a memory that are communicably coupled to each other and (ii) configured to:

control the electric motor and the brake mechanism by generating the first signal and the second signal;

store correlation data indicating correlation between the friction braking force generated by the brake mechanism and the second target value;

based on the stored correlation data, increase the friction braking force of the brake mechanism while reducing the regenerative braking force of the electric motor, during deceleration traveling performed in a low vehicle speed range where a vehicle speed of the vehicle is below a first threshold and both accelerator operation and brake operation performed by a driver who drives the vehicle are canceled;

determine, during the deceleration traveling in the low vehicle speed range, whether a change rate of a vehicle acceleration of the vehicle exceeds a second threshold;

in response to a determination that the change rate of the vehicle acceleration exceeds the second threshold, determine whether both of conditions (a) and (b) are satisfied:

(a) the vehicle is stopped; and (b) the brake operation is canceled;

in response to a determination that both conditions (a) and (b) are satisfied, execute first control in which:

(i) generate the second signal such that the second signal constantly indicates, as the second target value, a first value, the first value being a value at which the brake mechanism generates a predetermined friction braking force greater than zero; and then (ii) generate the first signal such that the driving force generated by the electric motor gradually increases;

determine, during execution of the first control, whether a rotation angle of a rotor of the electric motor from a start of the execution of the first control exceeds a third threshold;

in response to a determination that the rotation angle exceeds the third threshold, store the first target value indicated by the first signal at a first timing when the control system determines that the rotation angle exceeds the third threshold as a second value; and execute a correction process to rewrite the stored correlation data based on the first value and the second value.

2. A vehicle control apparatus to be applied to a vehicle, the vehicle control apparatus comprising:

an electric motor (i) coupled to one or both of a first wheel and a second wheel of the vehicle and (ii) configured to generate a driving force comprising a regenerative braking force in accordance with a first target value indicated by a first signal;

a brake mechanism (i) configured to brake one or both of the first wheel and the second wheel and (ii) configured to generate a friction braking force in accordance with a second target value indicated by a second signal; and circuitry configured to:

control the electric motor and the brake mechanism by generating the first signal and the second signal;

based on the stored correlation data, increase the friction braking force of the brake mechanism while reducing the regenerative braking force of the electric motor, during deceleration traveling performed in a low vehicle speed range where a vehicle speed of the vehicle is below a first threshold and both accelerator operation and brake operation performed by a driver who drives the vehicle are canceled;

determine, during the deceleration traveling in the low vehicle speed range, whether a change rate of a vehicle acceleration of the vehicle exceeds a second threshold;

in response to a determination that the change rate of the vehicle acceleration exceeds the second threshold, determine whether both of conditions (a) and (b) are satisfied:

(a) the vehicle is stopped; and (b) the brake operation is canceled;

in response to a determination that both conditions (a) and (b) are satisfied, execute first control in which:

(i) generate the second signal such that the second signal constantly indicates, as the second target value, a first value, the first value being a value at which the brake mechanism generates a predetermined friction braking force greater than zero; and then (ii) generate the first signal such that the driving force generated by the electric motor gradually increases;

determine, during execution of the first control, whether a rotation angle of a rotor of the electric motor from a start of the execution of the first control exceeds a third threshold;

in response to a determination that the rotation angle exceeds the third threshold, store the first target value indicated by the first signal at a first timing when the circuitry determines that the rotation angle exceeds the third threshold as a second value; and execute a correction process to rewrite the stored correlation data based on the first value and the second value.

3. The vehicle control apparatus according to claim 1, wherein the control system is further configured to:

in response to the determination that the change rate of the vehicle acceleration exceeds the second threshold, store the second target value indicated by the second signal at a second timing when the control system determines that the change rate of the vehicle acceleration exceeds the second threshold as a third value;

in response to execution of the correction process, determine whether all of conditions (c), (d), and (e) are satisfied:

(c) the vehicle is stopped;

(d) the accelerator operation is performed to start the vehicle; and (e) the brake operation is cancelled;

in response to a determination that all of conditions (c), (d), and (e) are satisfied, execute second control in which:

(i) generate the second signal such that the second signal indicates, as the second target value, the stored third value; and (ii) generate the first signal such that the first signal indicates, as the first target value, a value corresponding to the accelerator operation performed by the driver;

determine, during execution of the second control, whether an acceleration of the vehicle is greater than a fourth threshold;

in response to a determination that the acceleration of the vehicle is not greater than the fourth threshold, cancel rewriting of the correlation data by an immediately preceding correction process and return the correlation data to a state before execution of the immediately preceding correction process; and in response to a determination that the acceleration of the vehicle is greater than the fourth threshold, maintain the correlation data rewritten by the immediately preceding correction process.

4. The vehicle control apparatus according to claim 1, wherein the correlation data indicates, on a plane including a first axis indicating the second target value and a second axis indicating the friction braking force, a line representing a relationship between the second target value and the friction braking force; and wherein, in the correction process, the control system rewrites the correlation data such that the line passes through a point indicated by the first value on the first axis and by a fourth value on the second axis, the fourth value being a value of the friction braking force that offsets the driving force generated by the electric motor in accordance with the first target value equal to the second value.

5. The vehicle control apparatus according to claim 3, wherein the correlation data indicates, on a plane including a first axis indicating the second target value and a second axis indicating the friction braking force, a line representing a relationship between the second target value and the friction braking force; and wherein, in the correction process, the control system rewrites the correlation data such that the line passes through a point indicated by the first value on the first axis and by a fourth value on the second axis, the fourth value being a value of the friction braking force that offsets the driving force generated by the electric motor in accordance with the first target value equal to the second value.

6. The vehicle control apparatus according to claim 4, wherein, in the correction process, the control system rewrites the correlation data such that the line is translated in parallel on the plane.

7. The vehicle control apparatus according to claim 5, wherein, in the correction process, the control system rewrites the correlation data such that the line is translated in parallel on the plane.

* * * * *